United States Patent
Kusuno et al.

(10) Patent No.: US 9,336,631 B2
(45) Date of Patent: May 10, 2016

(54) REMOTE MONITORING TERMINAL DEVICE FOR MOBILE WORK VEHICLE OR VESSEL

(71) Applicant: YANMAR CO., LTD., Osaka-shi (JP)

(72) Inventors: Junya Kusuno, Osaka (JP); Manabu Satake, Osaka (JP); Keisuke Uezumiya, Osaka (JP); Hirofumi Sakamoto, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 0 days.

(21) Appl. No.: 14/350,629

(22) PCT Filed: Oct. 3, 2012

(86) PCT No.: PCT/JP2012/075603
§ 371 (c)(1),
(2) Date: Apr. 9, 2014

(87) PCT Pub. No.: WO2013/054707
PCT Pub. Date: Apr. 18, 2013

(65) Prior Publication Data
US 2014/0257625 A1    Sep. 11, 2014

(30) Foreign Application Priority Data
Oct. 12, 2011    (JP) .................................. 2011-225241

(51) Int. Cl.
*G07C 5/00*    (2006.01)
*H04Q 9/00*    (2006.01)

(52) U.S. Cl.
CPC .................. *G07C 5/008* (2013.01); *H04Q 9/00* (2013.01); *H04Q 2209/40* (2013.01); *H04Q 2209/823* (2013.01); *H04Q 2209/826* (2013.01); *H04Q 2209/883* (2013.01)

(58) Field of Classification Search
CPC ................................... G06Q 99/00; H04L 9/00
USPC ............................................. 705/52; 702/88
See application file for complete search history.

(56) References Cited

U.S. PATENT DOCUMENTS 5,475,597 A    12/1995    Buck
6,256,594 B1    7/2001    Yamamoto et al.
(Continued)

FOREIGN PATENT DOCUMENTS

JP    H11-65645 A    3/1999
JP    3011256 B2    2/2000
(Continued)

OTHER PUBLICATIONS

Supplementary European Search Report mailed Nov. 25, 2014, issued for the European patent application No. 12840351.6.
(Continued)

*Primary Examiner* — Thomas G Black
*Assistant Examiner* — Ana Thomas
(74) *Attorney, Agent, or Firm* — Locke Lord LLP

(57) ABSTRACT

Disclosed is a remote monitoring terminal device including: connection terminals (T, . . .); a data storage control section for storing, in a data storage section at predetermined interval (TA), only a predetermined number of latest data sets in data fed via the connection terminals (T, . . .); and a communications section, wherein in response to an occurrence of a predetermined event in the mobile work vehicle or vessel, the data storage control section stores in the data storage section the predetermined number of data sets including a data set obtained upon the occurrence of the predetermined event and transmits the predetermined number of data sets stored in the data storage section, together with information indicating the predetermined event, to a remote monitoring device via the communications section.

6 Claims, 22 Drawing Sheets

(56) References Cited

U.S. PATENT DOCUMENTS

| | | | |
|---|---|---|---|
| 2005/0267713 A1* | 12/2005 | Horkavi | G07C 5/085 702/188 |
| 2007/0100760 A1* | 5/2007 | Dawson | G06Q 1/06 705/52 |
| 2007/0268128 A1 | 11/2007 | Swanson et al. | |
| 2011/0010133 A1 | 1/2011 | Swanson et al. | |
| 2014/0244100 A1* | 8/2014 | Kusuno | G07C 5/0841 701/31.5 |
| 2014/0247138 A1* | 9/2014 | Kusuno | H04Q 9/00 340/870.01 |
| 2014/0310412 A1* | 10/2014 | Shinohara | B63B 49/00 709/224 |
| 2014/0324279 A1* | 10/2014 | Shinohara | H04Q 9/00 701/31.5 |

FOREIGN PATENT DOCUMENTS

| | | |
|---|---|---|
| JP | 2003-119831 A | 4/2003 |
| JP | 2007-228373 A | 9/2007 |
| JP | 2010-014498 A | 1/2010 |
| JP | 2011-176416 A | 9/2011 |
| WO | WO-2007/022154 A2 | 2/2007 |
| WO | WO-2007/022154 A3 | 2/2007 |

OTHER PUBLICATIONS

International Search Report dated Dec. 25, 2012, issued for PCT/JP2012/075603.

* cited by examiner

| Connection Terminal | Item | Output Element Qa | Connection Terminal | Item | Output Element Qb |
|---|---|---|---|---|---|
| T1 | 1 | Thresh Switch | T2 | 1 | Idling Engine Rotation |
| | 2 | Harvest Switch | | 2 | Working Engine Rotation |
| | 3 | Auger Clutch State | | 3 | Idling Engine Load Ratio |
| | 4 | Engine-related Warning (Charge) | | 4 | Working Engine Load Ratio |
| | 5 | Engine-related Warning (Hydraulic Pressure) | | 5 | Idling Vehicle Speed |
| | 6 | Engine-related Warning (Water Temperature) | | 6 | Working Vehicle Speed |
| | 7 | Engine-related Warning (Overload) | | 7 | Idling Swing Motor Rotation |
| | 8 | Engine-related Warning (Clogged Air Cleaner) | | 8 | Working Swing Motor Rotation |
| | 9 | Engine-related Warning (Clogged Rice Straw Discharger/Cutter) | | 9 | Calculated Harvest Output Rotation Value |
| | 10 | Engine-related Warning (Emergency Engine Shutdown) | | 10 | Harvest Height Data |
| | 11 | Clogged Harvest Pathway | | 11 | Secondary Rotation |
| | 12 | Counter Input Belt Slip | | 12 | Threshing Chamber Rotation |
| | 13 | Harvest Rotation Warning | | 13 | Processing Chamber Rotation |
| | 14 | HST Irregularity Warning | | 14 | Vehicle Height Data (Right) |
| | 15 | Backward Switch | | 15 | Vehicle Height Data (Left) |
| | 16 | Low-speed-gear Harvest State | | 16 | Incline Sensor |
| | 17 | High-speed-gear Harvest State | | 17 | Screening Flow Rate |
| | 18 | High-speed-cutting Harvest State | | 18 | Amount of Remaining Fuel |
| | 19 | Quick Harvest State | | 19 | Harvest Position Sensor |
| | 20 | Feed-depth Sensor (L) | | 20 | Battery Voltage |
| | 21 | Feed-depth Sensor (M) | ection Terminal | Item | Output Element Qc |
| | 22 | Feed-depth Sensor (H) | T3 | 1 | Integrated Time |
| | 23 | Economic Mode | | 2 | |
| | 24 | HST Subtransmission State | | 3 | |
| | 25 | Feed Chain Clutch Solenoid | | 4 | |
| | 26 | Slow-rising Harvest Switch | ection Terminal | Item | Output Element Qd |
| | 27 | Slow-falling Harvest Switch | T4 | 1 | Error Information 1 |
| | 28 | Fast-rising Harvest Switch | | 2 | Error Information 2 |
| | 29 | Fast-falling Harvest Switch | | 3 | Error Information 3 |
| | 30 | Autolift switch | | 4 | Error Information 4 |
| | 31 | Autosetting switch | ection Terminal | Item | Output Element Qe |
| | 32 | Quick Harvest Pedal | T5 | 1 | Switch 1 |
| | | | | 2 | Switch 2 |
| | | | | 3 | Switch 3 |
| | | | | 4 | Switch 4 |
| | | | | 5 | Switch 5 |
| | | | | 6 | Switch 6 |
| | | | | 7 | Switch 7 |
| | | | | 8 | Switch 8 |
| | | | ection Terminal | Item | Output Element Qf |
| | | | T6 | 1 | Battery Voltage |
| | | | | 2 | Board Temperature |

Fig.4

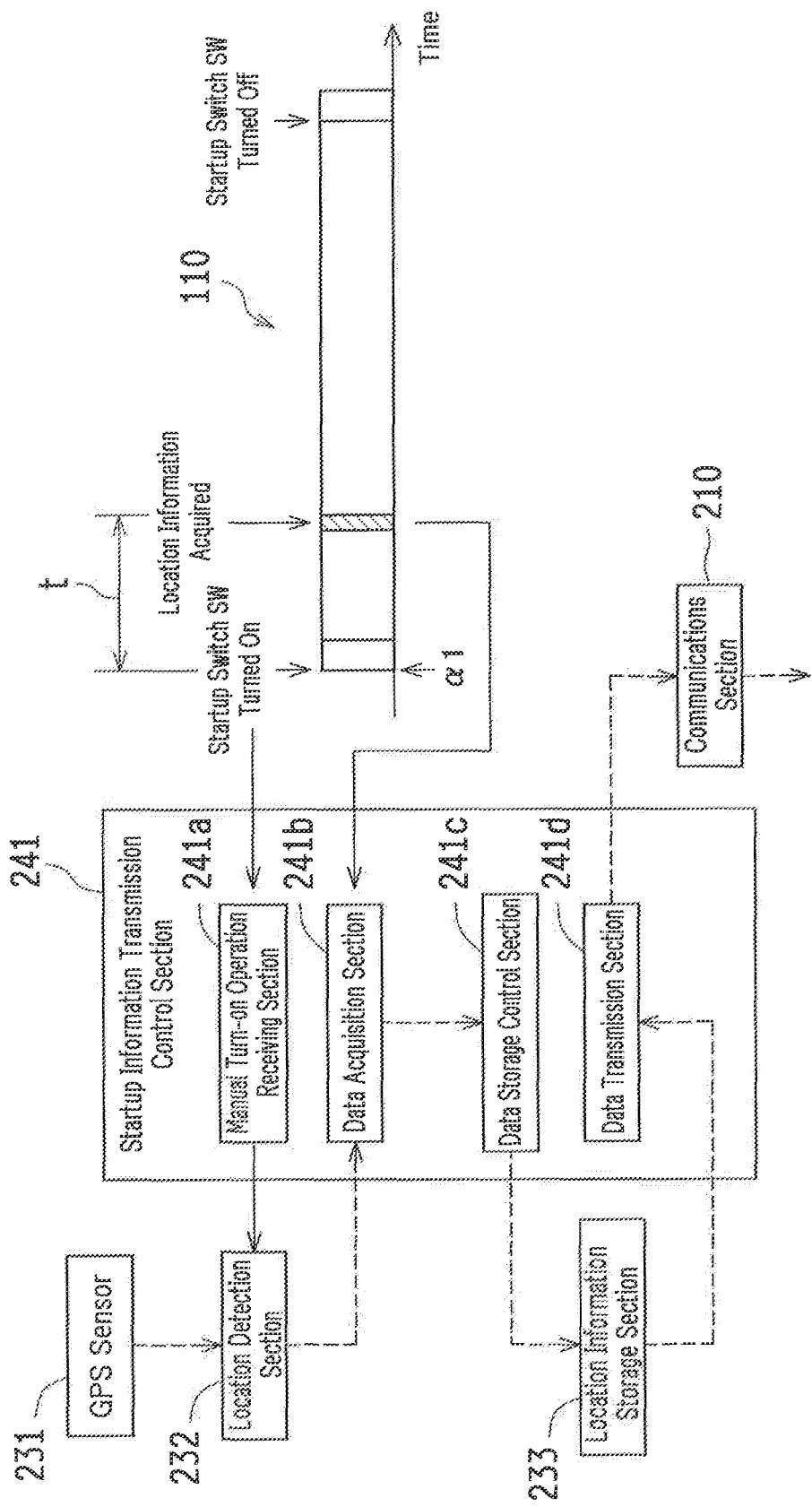

| Binary Information | Occurrence of Event | |
|---|---|---|
| | Turn-on Count | ON Duration (s) |
| Thresh Switch | 4 | 5757 |
| Harvest Switch | 5 | 5733 |
| Auger Clutch State | 9 | 680 |
| Engine-related Warning (Charge) | 1 | 0 |
| Engine-related Warning (Hydraulic Pressure) | 1 | 1 |
| Engine-related Warning (Water Temperature) | 0 | 0 |
| Engine-related Warning (Overload) | 6 | 3 |
| Engine-related Warning (Clogged Air Cleaner) | 0 | 0 |
| Engine-related Warning (Clogged Rice Straw Discharger/Cutter) | 0 | 0 |
| Engine-related Warning (Emergency Engine Shutdown) | 0 | 0 |
| ... | ... | ... |

| Detected Value Information | Average | Maximum | Minimum |
|---|---|---|---|
| Idling Engine Rotation | 1478 | 2671 | 224 |
| Working Engine Rotation | 2591 | 2721 | 2102 |
| Idling Engine Load Ratio | 13 | 96 | 0 |
| Working Engine Load Ratio | 57.5 | 100 | 0 |
| Idling Vehicle Speed | 0.11 | 1.83 | 0 |
| Working Vehicle Speed | 1.11 | 3.15 | 0 |
| Idling Swing Motor Rotation | 21 | 1102 | 0 |
| ... | ... | ... | ... |

| Integrated Information | Upon Startup | Upon Shutdown |
|---|---|---|
| Integrated Time | 150 | 153 |
| ... | ... | ... |
| ... | ... | ... |
| ... | ... | ... |

(Event Information Transmission Control)

(Trend Information Transmitting Function)

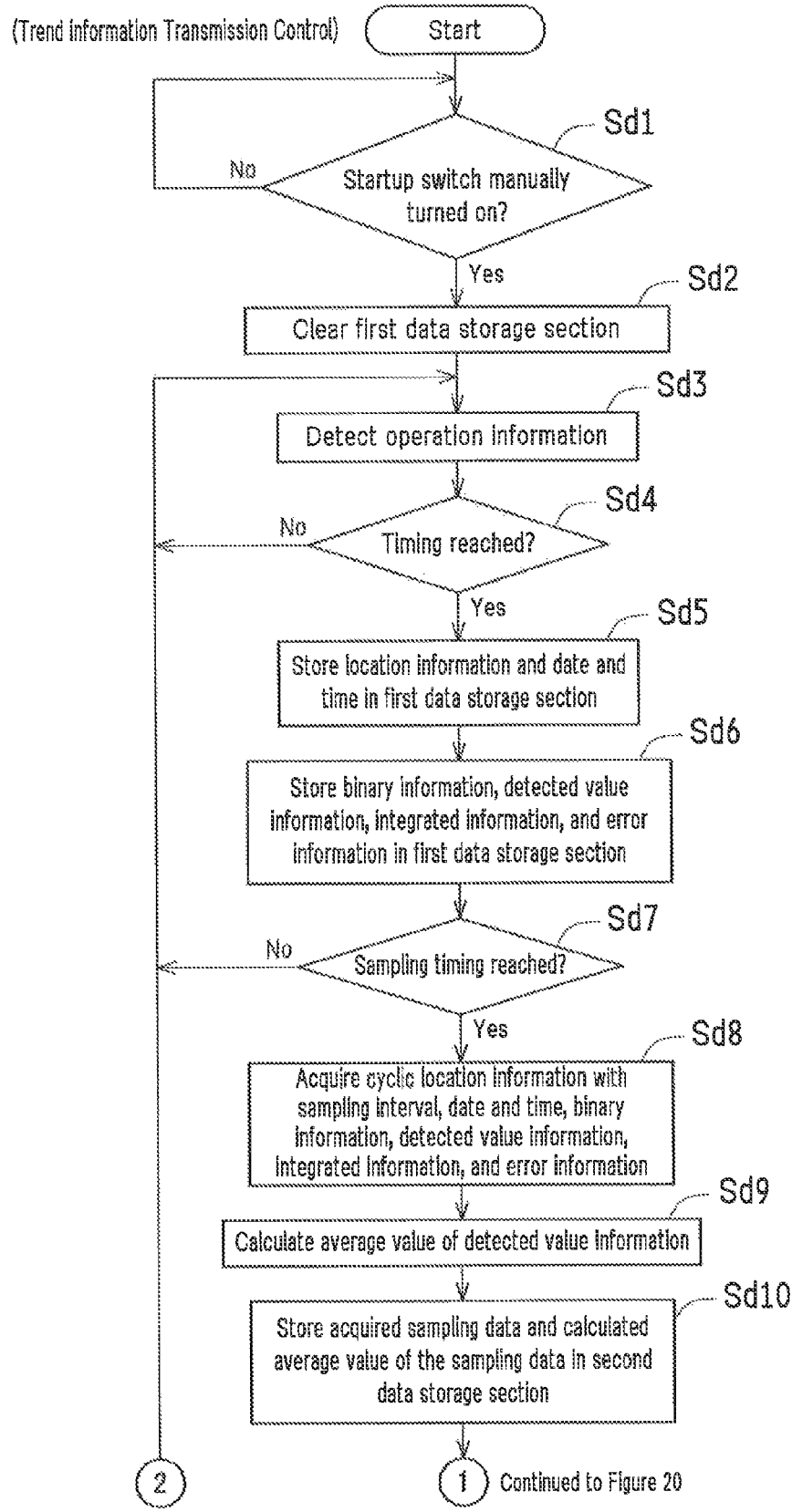

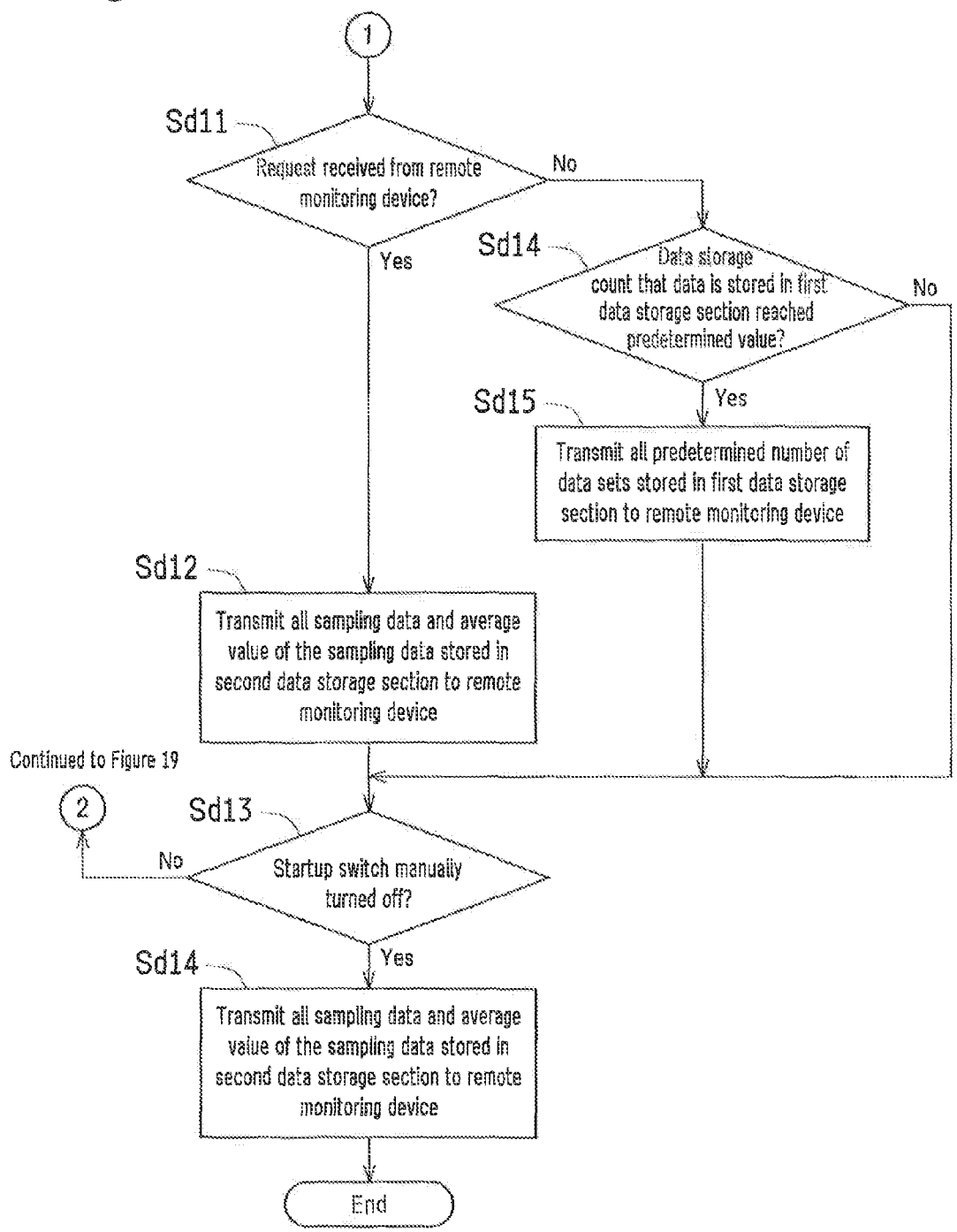

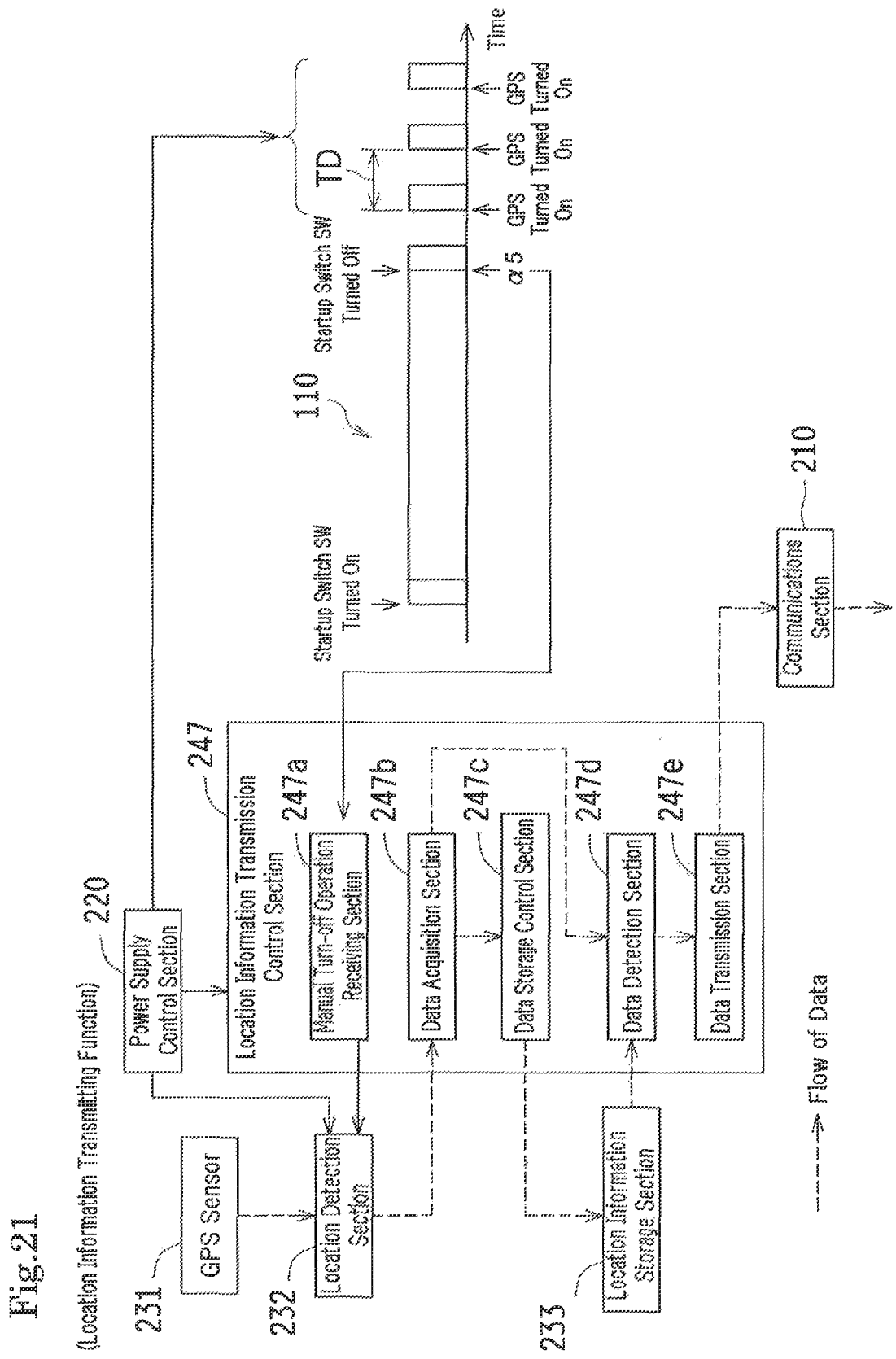

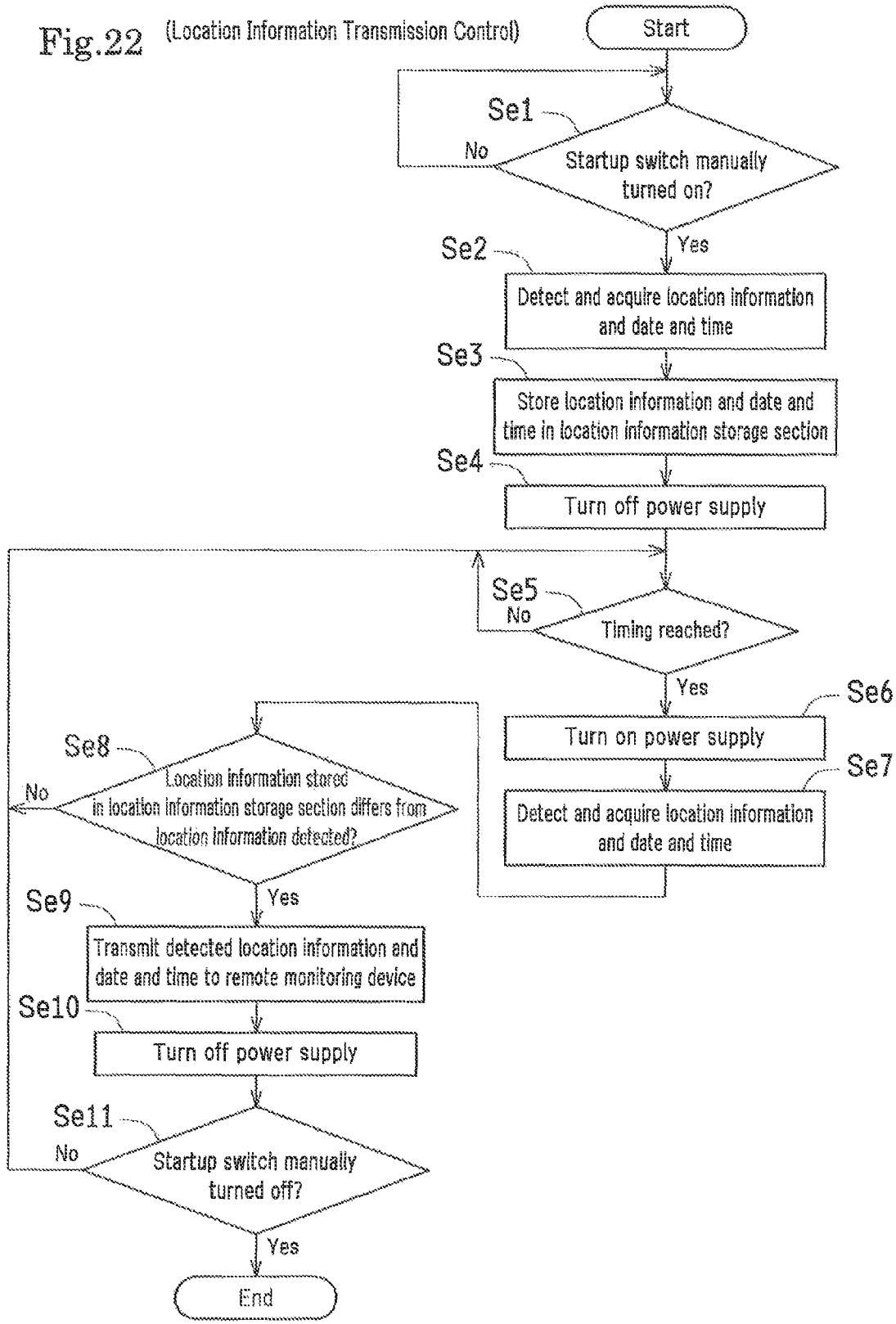

REMOTE MONITORING TERMINAL DEVICE FOR MOBILE WORK VEHICLE OR VESSEL

CROSS REFERENCE TO RELATED APPLICATIONS

This application is related to two co-pending applications: "REMOTE MONITORING TERMINAL DEVICE FOR MOBILE WORK VEHICLE OR VESSEL" filed even date herewith in the names of Junya KUSUNO, Manabu SATAKE, Keisuke UEZUMIYA and Hirofumi SAKAMOTO as a national phase entry of PCT/JP2012/075601 and "REMOTE MONITORING TERMINAL DEVICE FOR MOBILE WORK VEHICLE OR VESSEL" filed even date herewith in the names of Junya KUSUNO, Manabu SATAKE, Keisuke UEZUMIYA and Hirofumi SAKAMOTO as a national phase entry of PCT/JP2012/076003; which applications are assigned to the assignee of the present application and all incorporated by reference herein.

TECHNICAL FIELD

The present invention relates to a remote monitoring terminal device for mobile work vehicles (e.g., construction and agricultural machinery) or vessels (e.g., pleasure crafts and fishing boats), the remote monitoring terminal device being mounted to such a mobile work vehicle or vessel for communication with a remote monitoring device to enable the mobile work vehicle or vessel to be remotely monitored by the remote monitoring device.

BACKGROUND ART

Conventional remote monitoring systems have been known which enable communications between a remote monitoring device installed at a remote monitoring center and a remote monitoring terminal device mounted to, for example, a mobile work vehicle for monitoring of the mobile work vehicle.

For example, Patent Document 1 discloses a mobile work vehicle management system where maintenance-related data on an operation state is transmitted from a mobile work vehicle to a management section when an engine key switch is manually turned on or turned off (when an event has occurred). (See paragraphs [0024] and [0025] of Patent Document 1.)

CITATION LIST

Patent Literature

Patent Document 1: Japanese Patent Publication No. 3011256

SUMMARY OF THE INVENTION

Problems to be Solved by the Invention

However, Patent Document 1 does not disclose when to obtain the data to be transmitted in response to an occurrence of an event in the mobile work vehicle. For example, if the data to be transmitted is all obtained when an event has occurred, the system is not capable of precisely informing the user of the operation state of the mobile work vehicle in which the event has occurred.

Accordingly, the present invention has an object to provide a remote monitoring terminal device for a mobile work vehicle or vessel, the remote monitoring terminal device being mounted to a mobile work vehicle or vessel for communication with a remote monitoring device to enable the mobile work vehicle or vessel to be remotely monitored by the remote monitoring device, in order to precisely inform the user of the operation state of the mobile work vehicle or vessel in response to an occurrence of an event in the mobile work vehicle or vessel.

Solution to Problem

The present invention, to address the problems, provides a remote monitoring terminal device for a mobile work vehicle or vessel, the remote monitoring terminal device being mounted to a mobile work vehicle or vessel for communication with a remote monitoring device to enable the mobile work vehicle or vessel to be remotely monitored by the remote monitoring device, the remote monitoring terminal device including:
 connection terminals for feeding data on an operation state of the mobile work vehicle or vessel;
 a data storage control section for temporarily storing, in a data storage section at predetermined intervals, only a predetermined number of latest data sets in the data fed via the connection terminals; and
 a communications section for communication with the remote monitoring device,
 wherein in response to an occurrence of a predetermined event in the mobile work vehicle or vessel, the data storage control section stores in the data storage section the predetermined number of data sets including a data set obtained upon the occurrence of the predetermined event and transmits the predetermined number of data sets stored in the data storage section, together with information indicating the predetermined event, to the remote monitoring device via the communications section.

The present invention enables transmission of the data needed to precisely inform the user of the operation state of the mobile work vehicle or vessel to the remote monitoring device in response to an occurrence of a predetermined event in the mobile work vehicle or vessel. The data is, for example, a predetermined number of data sets including a data set obtained upon the occurrence of the predetermined event. Therefore, when a predetermined event has occurred in the mobile work vehicle or vessel, the user is capable of being precisely informed of the operation state of the mobile work vehicle or vessel in which the predetermined event has occurred.

In the present invention, the remote monitoring terminal device may be such that the data storage control section transmits any single one of the predetermined number of data sets stored in the data storage section, as well as the information indicating the predetermined event, to the remote monitoring device in response to the occurrence of the predetermined event and transmits the predetermined number of data sets to the remote monitoring device via the communications section in response to a request from the remote monitoring device for a transmission of the predetermined number of data sets.

This feature enables transmission of the predetermined number of data sets to the remote monitoring device if necessary in the remote monitoring device on the basis of the single data set.

In one aspect of the present invention, the occurrence of the predetermined event is a detection of an irregularity in the mobile work vehicle or vessel.

With this feature, the user is capable of being precisely informed of the operation state of the mobile work vehicle or vessel as of the detection of the irregularity.

In one aspect of the present invention, the occurrence of the predetermined event is a manual turn-on or turn-off of a manual operation member for issuing an instruction for the mobile work vehicle or vessel to implement a predetermined operation.

With this feature, the user is capable of being precisely informed of the operation state of the mobile work vehicle or vessel as of the manual turn-on or turn-off of the manual operation member.

Advantageous Effects of the Invention

As described above, the remote monitoring terminal device for a mobile work vehicle or vessel in accordance with the present invention is capable of, in response to an occurrence of a predetermined event in the mobile work vehicle or vessel, precisely informing the user of the operation state of the mobile work vehicle or vessel in which the predetermined event has occurred.

BRIEF DESCRIPTION OF DRAWINGS

FIG. 4 is a table showing concrete examples of output elements for various connection terminals in a case where the agricultural machine is a combine harvester.

FIG. 5 is a schematic operation diagram of an operation process for a startup information transmitting function implemented by a startup information transmission control section in a control section.

FIG. 10 is a schematic illustration of data structure in a third data storage section for use by an operation information transmission control section.

FIG. 19 is a flow chart depicting a first half of an exemplary operation of a trend information transmission control section.

FIG. 20 is a flow chart depicting a second half of the exemplary operation of the trend information transmission control section.

FIG. 21 is a schematic operation diagram of an operation process for a location information transmitting function implemented by a location information transmission control section in a control section.

FIG. 22 is a flow chart depicting an exemplary operation of a location information transmission control section.

DESCRIPTION OF EMBODIMENTS

The following will describe an embodiment of the present invention in reference to attached drawings by taking a combine harvester, tiller, rice transplanter, or like agricultural machinery as an example of the mobile work vehicle or vessel. The embodiment is given here for illustrative purposes only and by no means limiting the technical scope of the present invention.

Overall Arrangement of Remote Monitoring System

Figure 1:
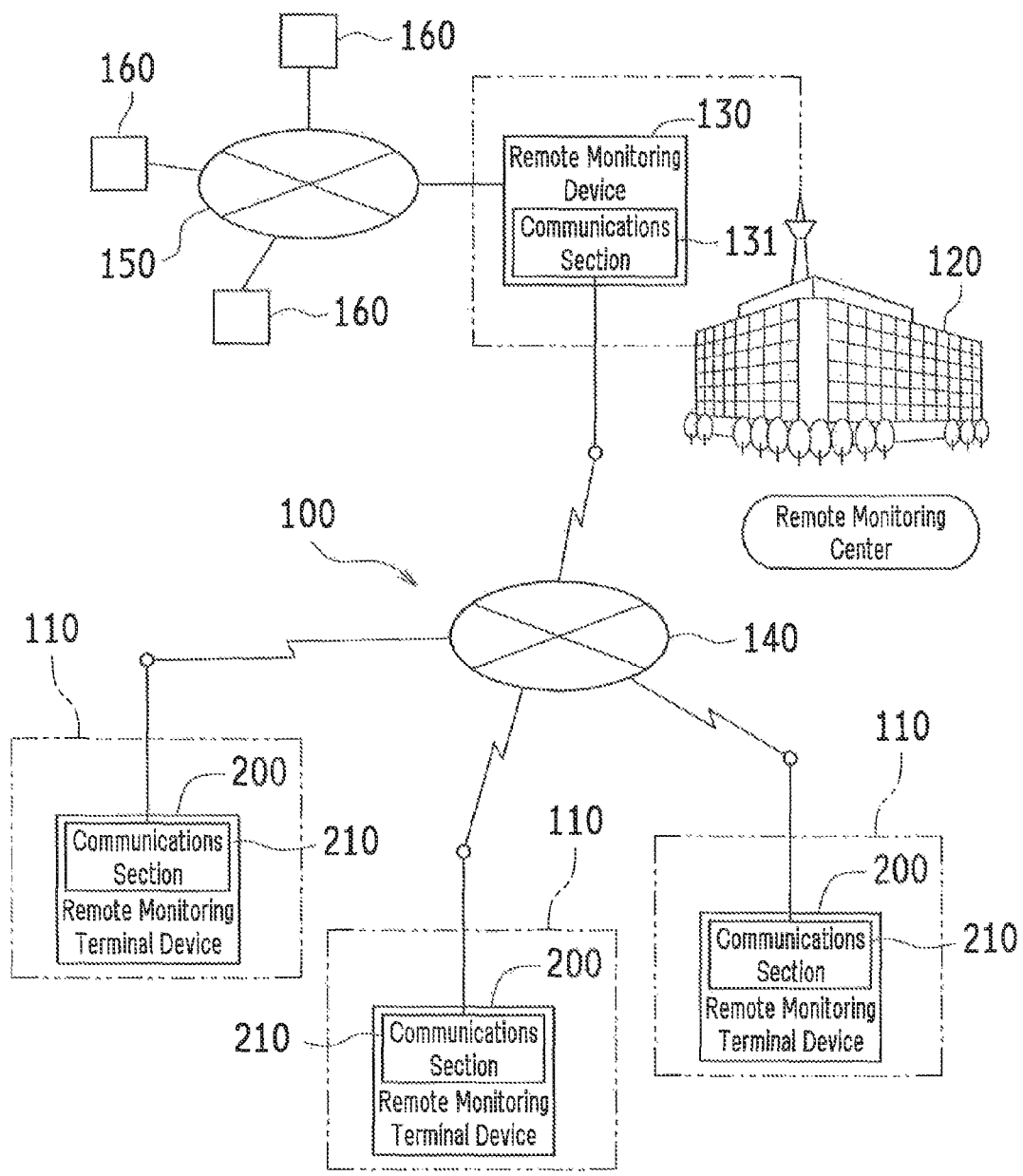
FIG. 1 is a schematic illustration of a remote monitoring system for remote monitoring of agricultural machines.
Figure 2:
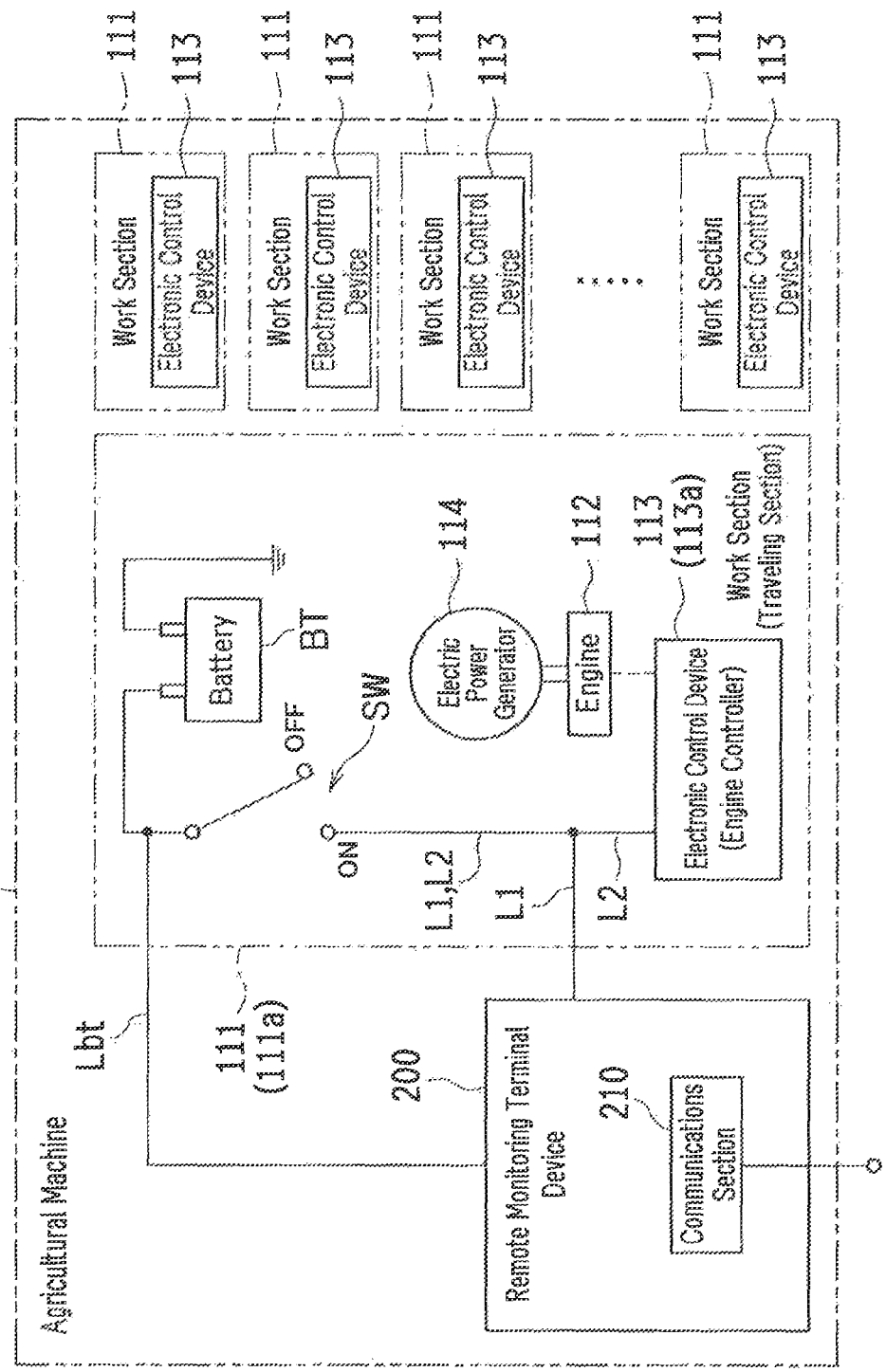
FIG. 2 is a schematic block diagram of the arrangement of an agricultural machine with a remote monitoring terminal device.
Figure 3:
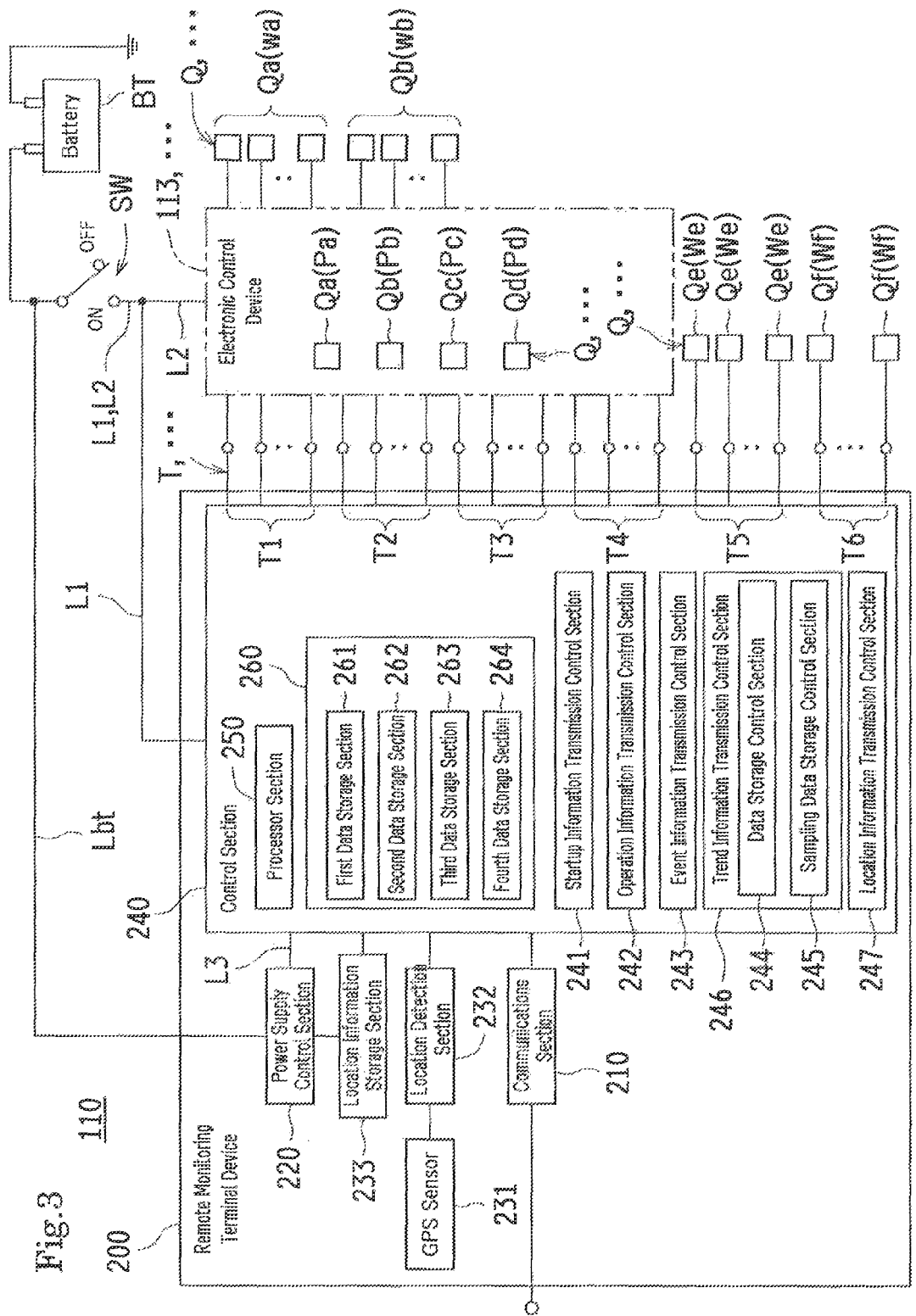
FIG. 3 is a schematic block diagram of the arrangement of a remote monitoring terminal device for an agricultural machine.

FIG. 1 is a schematic illustration of a remote monitoring system 100 for remote monitoring of agricultural machines 110. FIG. 2 is a schematic block diagram of the arrangement of an agricultural machine 110 with a remote monitoring terminal device 200. FIG. 3 is a schematic block diagram of the arrangement of a remote monitoring terminal device 200 for an agricultural machine 110.

As illustrated in FIG. 1, the remote monitoring system 100 includes at least one (in this case, two or more) agricultural machine (exemplary mobile work vehicle) 110, remote monitoring terminal devices 200, one for each agricultural machine 110, and a remote monitoring device 130 connected to the remote monitoring terminal devices 200 over a communications network 140.

The remote monitoring device 130 is installed at a remote monitoring center 120 located remotely from the agricultural machines 110 and collects and stores data on the operation states of the agricultural machines 110. The remote monitoring device 130 is connected to terminal devices 160 (e.g., personal computers and mobile terminals) over a network 150 (e.g., a LAN (local area network)). The device 130 feeds collected data to the terminal devices 160 to make the data available to users, for example, the users and sales agents of the agricultural machines 110.

Specifically, each remote monitoring terminal device 200 and the remote monitoring device 130 include respectively a communications section 210 and a communications section 131 (specifically, communications modules) and are connected to each other over the communications network 140 through the communications sections 210 and 131 to enable information exchange between the remote monitoring terminal device 200 and the remote monitoring device 130. Thus, the remote monitoring device 130 enables the user at the remote monitoring center 120 to remotely monitor the agricultural machines 110.

The communications network 140 may be a wired communications network, a wireless communications network, or a combination of a wired and wireless communications networks. The communications network 140 is typically a public line network provided by a telecommunications carrier, for example, a public line network that enables communications between fixed-line phones, mobile phones, and like terminals.

As illustrated in FIG. 2, each agricultural machine 110 includes at least one (in this case, two or more) work section 111 and a remote monitoring terminal device 200. The work section 111 may be, for example, a traveling section, a harvesting section, or a threshing section when the agricultural machine is a combine harvester.

Each work section 111 is equipped with an electronic control device (specifically, controller) 113 which instructs various actuators (not shown) to control the operation state of the work section 111 in a suitable manner. The electronic control devices 113 are capable of mutual data transfer in compliance with the CAN (Controller Area Network) standards.

Specifically, each electronic control device 113 controls the operation state of an associated work section 111 on the basis of detected value information (signals) detected by various sensors (detailed later) and on/off information of various switches (detailed later) in the work section 111. The electronic control device 113 evaluates, as needed, the presence/absence of irregularities, for example, whether there has occurred a breakdown/malfunction, in the agricultural machine 110. If there has occurred an irregularity, the device 113 generates error information (specifically, an error code) in accordance with the irregularity.

An actuator section 111 (traveling section 111*a*), or one of the work sections 111 which actuates an engine 112, includes the engine 112, an electronic control device 113 (engine controller 113*a*), an electric power generator 114, and a startup switch SW, and may further include a battery BT. The electronic control device 113 (engine controller 113*a*) monitors the rotational speed, load, and other conditions of the engine 112 to instruct a fuel system on, for example, an optimal injection pressure and an injection period for the control of the entire engine. The electronic control device 113 (engine controller 113*a*) controls manual startup/suspension operations and controls an operation state through activation of the engine 112, as well as controls the operation of the actuator section 111 (traveling section 111*a*).

After the actuator section 111 (traveling section 111*a*) is started (when the engine 112 is operating), the battery BT is charged, as needed, by an electric power supply from the electric power generator 114.

The startup switch SW of the actuator section 111 (traveling section 111*a*) is a toggling switch selectively toggling between a power-supply-on state and a power-supply-off state. The battery BT, in the power-supply-on state, supplies electric power to a control section 240 in the remote monitoring terminal device 200 and to the electronic control device 113 (engine controller 113*a*), whereas in the power-supply-off state, the battery BT is inhibited from supplying electric power to the control section 240 in the remote monitoring terminal device 200 and to the electronic control device 113 (engine controller 113*a*).

Specifically, the battery BT is connected both to a power supply connecting line L1 connected to the control section 240 in the remote monitoring terminal device 200 and to a power supply connecting line L2 connected to the electronic control device 113 (engine controller 113*a*) via the startup switch SW.

In this example, the startup switch SW is a "key switch." The startup switch SW has an ON terminal connected to the power supply connecting lines L1 and L2 while the engine 112 is operating and an OFF terminal used while the startup switch SW is being turned off.

As will be detailed later, the battery BT is connected to a power supply control section 220 in the remote monitoring terminal device 200 via a power supply connecting line Lbt to periodically start up power supply, no matter whether the startup switch SW is being turned on or off. Hence, the power supply control section 220 in the remote monitoring terminal device 200 is always fed with electric power from the battery BT.

Remote Monitoring Terminal Device

As illustrated in FIG. 3, the remote monitoring terminal device 200 includes a communications section 210, a power supply control section 220, a control section 240, and connection terminals T. The power supply control section 220 periodically starts up power supply while the startup switch SW of the agricultural machine 110 is being turned off. The control section 240, during communication, transmits/receives data and controls various inputs/outputs and computations. The remote monitoring terminal device 200 receives inputs of data on the operation state of the agricultural machine 110 via the connection terminals T.

Communications Section

The communications section 210 is capable of the same communications protocols as the communications section 131 in the remote monitoring device 130 at the remote monitoring center 120 so that the communications section 210 can communicate with the communications section 131. The communications section 210 converts the data to be transmitted/received during communication according to the communications protocols. The communications section 210 then transmits the data, acquired by the control section 240, on the operation state of the agricultural machine 110 to the remote monitoring device 130.

Power Supply Control Section

The power supply control section 220 has a timer function and is connected to the battery BT, no matter whether the startup switch SW is being turned off or on. Specifically, the battery BT is connected to an incoming power supply line (not shown) for the power supply control section 220 via the power supply connecting line Lbt, so that the power supply control section 220 can be always fed with electric power from the battery BT.

An outgoing power supply line (not shown) for the power supply control section 220 is connected to a power supply line (not shown) for the control section 240 via a power supply connecting line L3.

In the remote monitoring terminal device 200, the control section 240 is periodically fed with electric power from the battery BT by virtue of the timer function of the power supply control section 220 while the startup switch SW is being turned off to inhibit electric power from being supplied to the power supply connecting line L1 which connects the battery BT to the incoming power supply line for the control section

240. This arrangement is for the purpose of reducing the power consumption of the battery BT.

Specifically, a predetermined interval (e.g., 30 minutes) is set on the power supply control section 220. In other words, the incoming and outgoing power supply lines for the power supply control section 220 are not interconnected until a predetermined interval ends. When the predetermined interval ends, the power supply control section 220 interconnects the incoming and outgoing power supply lines only for a predetermined duration (e.g., 360 seconds (6 minutes)). Thus, the power supply control section 220 is capable of supplying electric power from the battery BT to the control section 240 at predetermined intervals.

Location Detection Section

In the present embodiment, the remote monitoring terminal device 200 further includes a GPS (Global Positioning System) sensor (exemplary location sensor) 231, a location detection section 232, and a location information storage section 233. The GPS sensor 231 receives radio waves from GPS satellites. The location detection section 232 detects the location information of the agricultural machine 110 in the radio waves received by the GPS sensor 231. The location information storage section 233 temporarily stores therein the location information detected by the location detection section 232.

The GPS sensor 231 receives radio waves (information containing an international standard time) from GPS satellites.

The location detection section 232 is capable of detecting, besides the location information of the agricultural machine 110, the velocity and orientation information of the agricultural machine 110. In other words, the location information contains information on the latitude, longitude, velocity, and orientation of the agricultural machine 110.

Specifically, the location detection section 232, along with the GPS sensor 231 and GPS satellites, constitutes a positioning system. The location detection section 232 is capable of acquiring location information (e.g., the latitude and longitude) on the current location of the agricultural machine 110 by receiving radio waves from three or more GPS satellites with the GPS sensor 231 and calculating distance from each of the GPS satellites based on the time difference between the time sent and the time received. The location detection section 232 is also capable of acquiring the velocity and orientation information of the agricultural machine 110 by calculating a change in location per unit time.

The location information storage section 233 is a volatile memory, such as a RAM (random access memory). The location information storage section 233 is connected to the power supply control section 220 so as to be always fed with electric power from the battery BT. Thus, the location information storage section 233 is capable of maintaining the location information even while the startup switch SW is being turned off.

Control Section

The control section 240 includes a processor section 250 and a storage section (exemplary data storage section) 260. The processor section 250 is composed of a CPU (central processing unit) or like microcomputer. The storage section 260 is composed primarily of a ROM (read only memory), RAM, and like volatile memory.

The control section 240 controls the operation of various components by the processor section 250 loading control programs stored in advance in the ROM in the storage section 260 to the RAM in the storage section 260 and executing them. The RAM in the storage section 260 provides first to fourth data storage sections 261 to 264.

Connection Terminals

Multiple (in this case, 70) connection terminals T serve as multiple types of connection terminals connected to output elements Q at which data on the operation state of the agricultural machine 110 is supplied externally. In the present embodiment are there provided at least one (in this case, 32) first connection terminal T1, at least one (in this case, 20) second connection terminal T2, at least one (in this case, 4) third connection terminal T3, at least one (in this case, 4) fourth connection terminal T4, at least one (in this case, 8) fifth connection terminal T5, and at least one (in this case, 2) sixth connection terminal T6.

The first, second, third, and fourth connection terminals T1, T2, T3, and T4 are connected to the control section 240. The first and second connection terminals T1 and T2 are connected to the output elements Q for the work sections 111 via the electronic control devices 113. The fifth and sixth connection terminals T5 and T6 are connected to the control section 240 and also directly to the output elements Q for the work sections 111.

The first connection terminals T1 are connected to output elements Qa at which binary information (specifically, binarized signals) is available, to receive the binary information at the output elements Qa. The binary information is, for example, on/off information (specifically, contact point information represented by a 0 or 1) and error status information (specifically, error presence/absence information represented by a 0 or 1) indicating the presence/absence of a breakdown/malfunction or like irregularity. In this example, the binary information is transmitted in the form of CAN bit data.

The output elements Qa at which binary information is available may be composed of for example, various switches Wa which are connected to input circuitry for the electronic control devices 113 for output of on/off information on the operation state of the agricultural machine 110. Another example would be an output control section Pa in an electronic control device 113 for output of error status information indicating the presence/absence of a breakdown/malfunction or like irregularity in the work sections 111.

Specifically, if the output elements Qa are composed of various switches Wa, the first connection terminals T1 receive on/off information from the various switches Wa via the electronic control devices 113; if the output elements Qa are provided as an output control section Pa, the first connection terminals T1 receive error status information from the output control section Pa in the electronic control devices 113.

The second connection terminals T2 are connected to output elements Qb at which detected value information (specifically, multivalue digital signals) is available, to receive the detected value information at the output elements Qb. The detected value information is, for example, numeric value data indicating measured (detected) values of a predetermined set of physical quantities, error codes indicating the type of the breakdown/malfunction or like irregularity, and the voltage level of the battery BT. In this example, the detected value information is transmitted in the form of CAN numeric value data.

The output elements Qb at which detected value information is available may be composed of, for example, various sensors Wb which are connected to input circuitry for the electronic control devices 113 for detection of the operation state of the agricultural machine 110. Another example would be an output control section Pb in an electronic control device 113 (engine controller 113*a*) for output of the voltage level of the battery BT.

Specifically, if the output elements Qb are composed of various sensors Wb, the second connection terminals T2 receive numeric value data from the various sensors Wb via the electronic control devices 113; if the output elements Qb are provided as an output control section Pb, the second connection terminals T2 receive the voltage level of the battery BT from the output control section Pb in the electronic control device 113 (engine controller 113a).

The third connection terminals T3 are connected to output elements Qc at which integrated information (e.g., an integrated time) is available, to receive the integrated information at the output elements Qc. In this example, the integrated information is transmitted in the form of CAN integrated data.

The output elements Qc at which integrated information is available may be provided as, for example, an output control section Pc in an electronic control device 113 (engine controller 113a) for output of an integrated time obtained by integrating the operation times of the engine 112. An operation time is the time from a startup of the engine 112 (when the startup switch SW is turned on) to a subsequent shutdown of the engine 112 (when the startup switch SW is turned of).

Specifically, if the output elements Qc are provided as an output control section Pc, the third connection terminals T3 receive the integrated time of the engine 112 from the output control section Pc in the electronic control device 113 (engine controller 113a).

The fourth connection terminals T4 are connected to output elements Qd at which error information according to the CAN communications protocol is available, to receive error information at the output elements Qd.

The output elements Qd at which error information is available may be provided as, for example, an output control section Pd in an electronic control device 113 for identification of an error in view of the specifications of the CAN communications protocol and for output of error information in accordance with the error.

Specifically, if the output elements Qd are provided as an output control section Pd, the fourth connection terminals T4 receive error information from the output control section Pd in the electronic control device 113.

The fifth connection terminals T5 are connected to output elements Qe at which binary information is available, to receive the binary information at the output elements Qe.

The output elements Qe at which binary information is available may be composed of for example, various switches We provided for output of on/off information on the operation state of the agricultural machine 110.

Specifically, if the output elements Qe are composed of various switches We, the fifth connection terminals T5 receive the on/off information directly from the various switches We. The fifth connection terminals T5 may be used when the work sections 111 include an electronic control device 113. However, the terminals T5 will be advantageously used primarily when the work sections 111 do not include an electronic control device 113.

The sixth connection terminals T6 are connected to output elements Qf at which detected value information (specifically, analog signals) is available, to receive the detected value information at the output elements Qf. The detected value information is, for example, numeric value data indicating measured (detected) values of a predetermined set of physical quantities (e.g., the voltage level of the battery BT and the temperature of a board (not shown) mounted in an electronic control device 113).

The output elements Qf at which detected value information is available may be composed of, for example, various sensors Wf for detection of the operation states of the agricultural machines 110.

Specifically, if the output elements Qf are composed of various sensors Wf, the sixth connection terminals T6 receive numeric value data directly from the various sensors Wf.

The startup information transmission control section 241, the operation information transmission control section 242, the event information transmission control section 243, the data storage control section 244, the sampling data storage control section 245, the trend information transmission control section 246, and the location information transmission control section 247, all shown in FIG. 3, will be detailed later.

FIG. 4 is a table showing concrete examples of output elements Qa to Qf for various connection terminals T1 to T6 in a case where the agricultural machine 110 is a combine harvester.

As listed in FIG. 4, the output elements Qa connected to the first connection terminals T1 are fed, from the first connection terminals T1, with 32 items of binary information, including warnings on a thresh switch, a harvest switch, an engine-related charge, a hydraulic pressure, water temperature, an overload, a clogged air cleaner, a clogged rice straw discharger/cutter, and an emergency engine shutdown. The output elements Qb connected to the second connection terminals T2 are fed, from the second connection terminals T2, with 20 items of detected value information, including the rotational speed of the engine 112 in and out of operation, the engine load ratio of the engine 112 approximately indicating a load on the engine 112 in and out of operation, the vehicle speed in and out of operation, and the rotational speed of the swing motor in and out of operation. The output elements Qc connected to the third connection terminals T3 are fed with 4 items of integrated information (in this example, one item of integrated information) from the third connection terminals T3. The output elements Qd connected to the fourth connection terminals T4 are fed with 4 items of error information from the fourth connection terminals T4. The output elements Qe connected to the fifth connection terminals T5 are fed with 8 items of binary information from the fifth connection terminals T5. The output elements Qf connected to the sixth connection terminals T6 are fed with 2 items of detected value information (specifically, battery voltage and board temperature) from the sixth connection terminals T6.

The control section 240 includes a startup information transmission control section 241, an operation information transmission control section 242, an event information transmission control section 243, a trend information transmission control section 246, and a location information transmission control section 247. The startup information transmission control section 241 provides a startup information transmitting function for the transmission of startup information under particular conditions. The operation information transmission control section 242 provides an operation information transmitting function for the transmission of operation information under particular conditions. The event information transmission control section 243 provides an event information transmitting function for the transmission of event information under particular conditions. The trend information transmission control section 246 provides a trend information transmitting function for the transmission of trend information under particular conditions. The location information transmission control section 247 provides a location information transmitting function for the transmission of location information and a date and time under particular conditions.

Next, the startup information transmitting function, the operation information transmitting function, the event information transmitting function, the trend information transmitting function, and the location information transmitting function will be described one after the other.

Startup Information Transmitting Function

FIG. 5 is a schematic operation diagram of an operation process for the startup information transmitting function implemented by the startup information transmission control section 241 in the control section 240.

The control section 240 includes the startup information transmission control section 241 which transmits startup information to the remote monitoring device 130 when the startup switch SW of the agricultural machine 110 is manually turned on (denoted by α1 in FIG. 5). The startup information contains the location information (specifically, longitude and latitude) of the agricultural machine 110 and a date and time (specifically, year, month, day, hour, minute, and second according to the international standard Gregorian calendar) obtained upon a startup. The location information may contain the velocity and orientation of the agricultural machine 110.

Specifically, the startup information transmission control section 241 operates as a work section containing a manual turn-on operation receiving section 241a, a data acquisition section 241b, a data storage control section 241c, and a data transmission section 241d. The manual turn-on operation receiving section 241a receives a manual turn-on operation of the startup switch SW of the agricultural machine 110. The data acquisition section 241b detects and acquires the location information of the agricultural machine 110 and a date and time by means of the GPS sensor 231 and the location detection section 232 when the manual turn-on operation receiving section 241 has received a manual turn-on operation. The data storage control section 241c temporarily stores in the location information storage section 233 the location information and date and time acquired by the data acquisition section 241b. The data transmission section 241d transmits the location information and date and time stored in the location information storage section 233 to the remote monitoring device 130 via the communications section 210.

Figure 6:
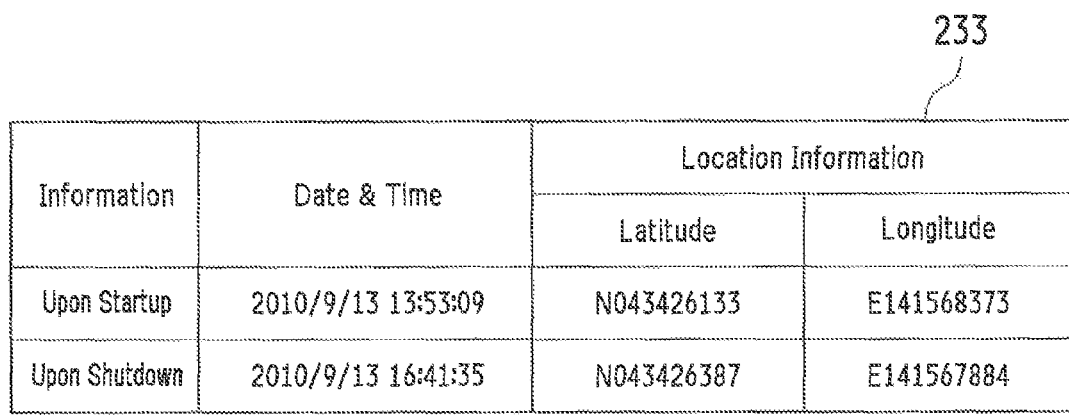
FIG. 6 is a schematic illustration of data structure in a location information storage section employed by a startup information transmission control section.

FIG. 6 is a schematic illustration of data structure in the location information storage section 233 for use by the startup information transmission control section 241.

As illustrated in FIG. 6, the location information storage section 233 stores therein a date and time (specifically, year, month, day, hour, minute, and second according to the international standard Gregorian calendar) and location information (latitude and longitude) when the startup switch SW of the agricultural machine 110 has been manually turned on (upon a startup). The location information storage section 233 further stores therein a date and time (specifically, year, month, day, hour, minute, and second according to the international standard Gregorian calendar) and location information (latitude and longitude) by means of a data acquisition section 247b and a data storage control section 247c (detailed later) in the location information transmission control section 247 when a manual turn-off operation receiving section 247a has received a manual turn-off operation of the startup switch SW of the agricultural machine 110.

The time t from a manual turn-on operation of the startup switch SW to an acquisition of the location information of the agricultural machine 110 and a date and time in a detecting operation of the GPS sensor 231 (see FIG. 5) may be, for example, approximately 40 seconds to 180 seconds.

If no startup information is acquired within a predetermined period (e.g., 300 seconds (5 minutes)) after a manual turn-on operation of the startup switch SW, the data transmission section 241d transmits, to the remote monitoring device 130, manual turn-on operation information indicating that the startup switch SW has been manually turned on, in place of startup information, under the control of the startup information transmission control section 241.

The location information storage section 233 stores therein startup information for a predetermined number of previous manual turn-on/off operations (e.g., for a single manual turn-on/off operation). A pair of manual turn-on and turn-off operations of the startup switch SW is counted as a single manual turn-on/off operation.

The remote monitoring terminal device 200 converts, in the communications section 210, the startup information into a format that is in accordance with the communications protocols for the communications section 131 in the remote monitoring device 130. Thereafter, the remote monitoring terminal device 200 transmits the converted startup information to the remote monitoring device 130 over the communications network 140 and via the communications section 131. This enables the remote monitoring center to check the startup information (specifically, latitude and longitude and year, month, day, hour, minute, and second according to the international standard Gregorian calendar) of the agricultural machine 110. A similar arrangement applies to operation information for the operation information transmitting function, event information for the event information transmitting function, trend information for the trend information transmitting function, and location information for the location information transmitting function (detailed later).

Exemplary Operation of Startup Information Transmission Control Section

Next will be described an exemplary operation of the startup information transmission control section 241 in reference to FIG. 7 which is a flow chart depicting an exemplary operation of the startup information transmission control section 241.

Figure 7:
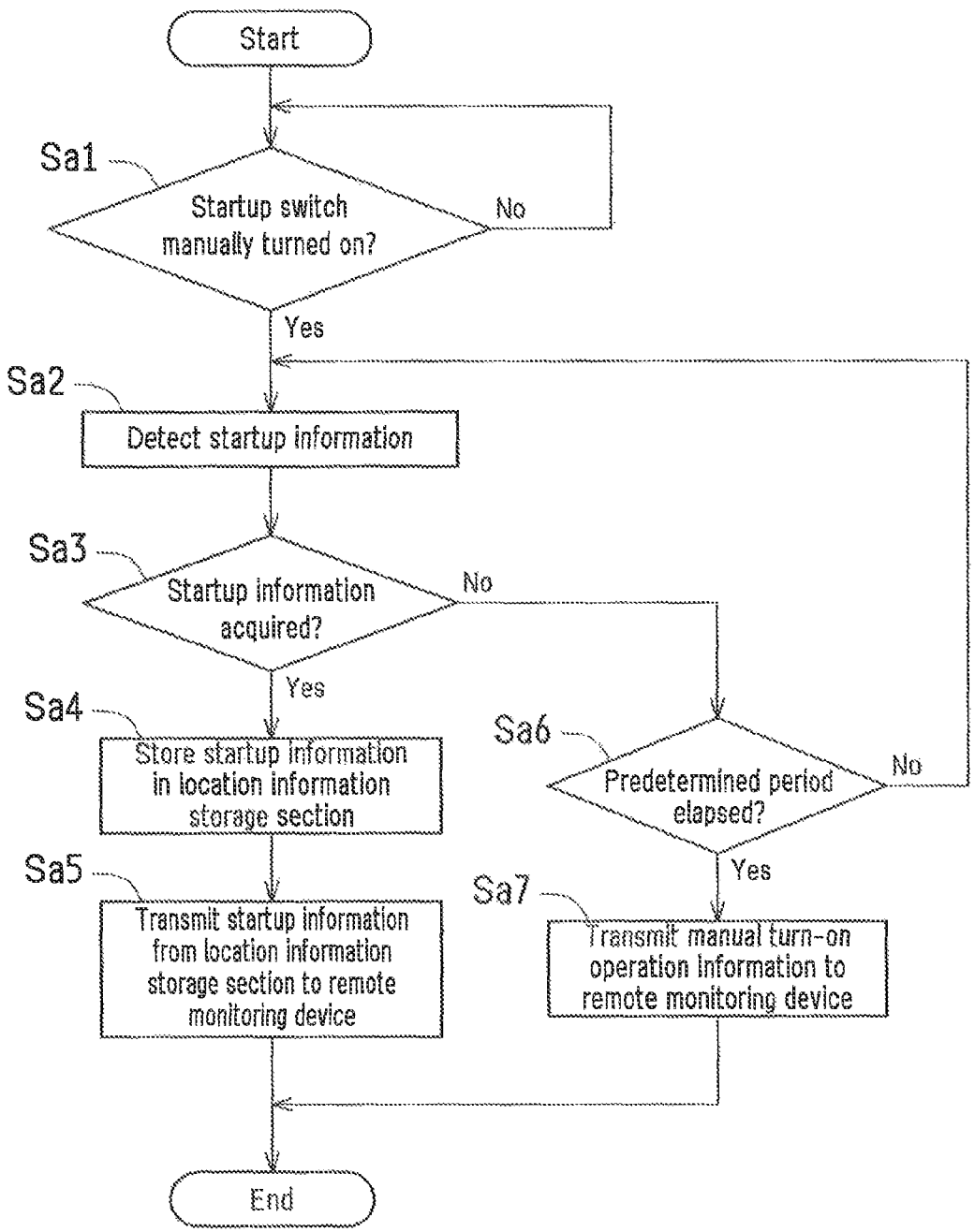
FIG. 7 is a flow chart depicting an exemplary operation of a startup information transmission control section.

According to the flow chart shown in FIG. 7, upon the startup switch SW being manually turned on (Yes in step Sa1), the GPS sensor 231 and the location detection section 232 detect the startup information of the agricultural machine 110 (in this example, location information and a date and time) (step Sa2).

Next, it is determined whether the startup information of the agricultural machine 110 has been acquired (step Sa3). If the startup information has been acquired (Yes in step Sa3), the acquired startup information is stored in the location information storage section 233 (step Sa4), and the startup information stored in the location information storage section 233 is transmitted to the remote monitoring device 130 (step Sa5), which ends the process. On the other hand, if it is determined in step Sa3 that the startup information of the agricultural machine 110 has not been acquired (No in step Sa3), it is determined whether a predetermined period (in this example, 300 seconds) has elapsed (step Sa6). If the predetermined period has not elapsed (No in step Sa6), the process proceeds to step Sa2. On the other hand, if it is determined in step Sa6 that the predetermined period has elapsed (Yes in step Sa6), manual turn-on operation information indicating that the startup switch SW has been manually turned on is transmitted to the remote monitoring device 130 (step Sa7), which ends the process.

The startup information transmitting function described above enables transmission to the remote monitoring device 130 of the data needed to inform the user of the startup information of the agricultural machine 110 (specifically, location information and a date and time) obtained upon the startup. Therefore, the user is capable of being informed of the startup information of the agricultural machine 110 (specifically, location information and a date and time) obtained upon the startup.

Operation Information Transmitting Function

Figure 8:
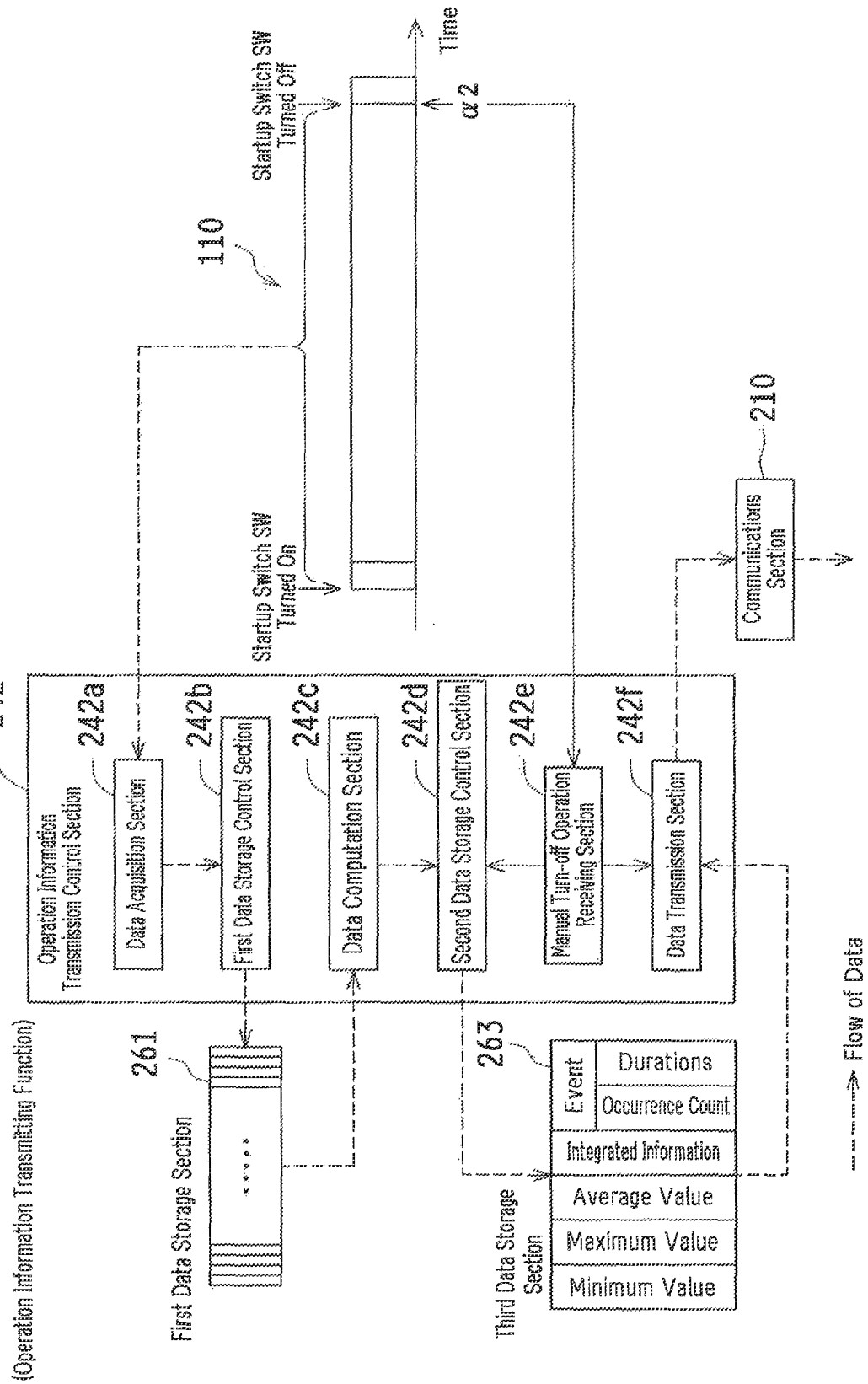
FIG. 8 is a schematic operation diagram of an operation process for an operation information transmitting function implemented by an operation information transmission control section in a control section.

FIG. 8 is a schematic operation diagram of an operation process for the operation information transmitting function implemented by the operation information transmission control section 242 in the control section 240. The GPS sensor 231, the location detection section 232, and the location information storage section 233 are omitted in FIG. 8.

The control section 240 includes the operation information transmission control section (exemplary data abridging control section) 242 for transmitting operation information to the remote monitoring device 130 when the startup switch SW of the agricultural machine 110 is manually turned off (denoted by α2 in FIG. 8).

Specifically, the operation information transmission control section 242 operates as a work section containing a data acquisition section 242a, a first data storage control section 242b, a data computation section 242c, and a second data storage control section 242d. The data acquisition section 242a acquires, at predetermined intervals (e.g., every 0.1 seconds), data (see FIGS. 4 and 6) on the operation state of the agricultural machine 110 fed via the connection terminals T. The first data storage control section 242b temporarily stores in the first data storage section (specifically, ring buffer) 261a predetermined number of latest data sets (points in time) (e.g., 600 sets (points in time)) in the cyclic data acquired by the data acquisition section 242a. The data computation section 242c computes minimum, maximum, and average values of part of the data on the operation state collected over a period from a manual turn-on of the startup switch SW to the latest data acquisition and also an occurrence count and durations of a predetermined event during that period, all on the basis of the cyclic data stored in the first data storage control section 242b. The second data storage control section 242d temporarily stores in the third data storage section 263 the minimum and maximum values in the data on the operation state of the agricultural machine 110 and the occurrence count and durations of a predetermined event, all computed by the data computation section 242c. The second data storage control section 242d also temporarily stores the integrated and error information in the third data storage section 263. In the present embodiment, the first data storage section 261 is used as a ring buffer in which data is stored in storage areas arranged in series, both ends of the buffer being logically linked so that the buffer can be handled like a ring.

The operation information contains the location information (specifically, longitude and latitude) and the date and time (specifically, year, month, day, hour, minute, and second according to the international standard Gregorian calendar) (see FIG. 6) when the startup switch SW of the agricultural machine 110 is manually turned on; the location information (specifically, longitude and latitude) and the date and time (specifically, year, month, day, hour, minute, and second according to the international standard Gregorian calendar) (see FIG. 6) when the startup switch SW of the agricultural machine 110 is manually turned off. the turn-on counts of the various switches Wa and We (i.e., the numbers of times that the various switches Wa and We are manually turned on) over a period from a manual turn-on to a subsequent manual turn-off of the startup switch SW of the agricultural machine 110; the turn-on durations of the various switches Wa and We (i.e., the durations in which the various switches Wa and We are turned on); the minimum, maximum, and average values of the detected values fed via the various sensors Wb and WE the integrated information obtained upon startups and shutdowns fed via the various sensors Wb and WE the occurrence count and durations of a predetermined event; and error information (specifically, error codes) for a predetermined, sequential occurrence count. The error information (specifically, error codes) other than for the predetermined occurrence count (e.g., 4) is not transmitted (not stored).

The predetermined interval is by no means limited in any particular manner and may be, for example, any first interval (specifically, 0.1 seconds) longer than 0 seconds and shorter than 1 second or any second interval (specifically, 1 second) longer than or equal to 1 second and shorter than 60 seconds. In this example, the predetermined interval is 0.1 seconds. The operation information transmission control section 242 may selectively switch between the first interval (specifically, 0.1 seconds) and the second interval (specifically, 1 second). When this is the case, the switching between the first and second intervals may be done either in the remote monitoring terminal device 200 or in the remote monitoring device 130.

Value settings for the first and second intervals and items of the binary information, detected value information, and error information may be changeable. When this is the case, the value settings for the first and second intervals and items of the binary information, detected value information, and error information may be changed in the remote monitoring terminal device 200 or in the remote monitoring device 130. In addition, the remote monitoring terminal device 200 may be capable of accepting or rejecting an instruction from the remote monitoring device 130 for a change in the value settings for the first and second intervals and items of the binary information, detected value information, and error information.

An occurrence of a predetermined event is an occurrence of a predetermined manual operation or action or of a change in state which can happen accidentally or indeliberately in the agricultural machine 110. A predetermined event can happen, for example, when an error has occurred which indicates an irregularity (specifically, irregular charge (power generation), irregular hydraulic pressure, irregular water temperature, etc.) during a predetermined procedure, when a predetermined manual operation section (specifically, a manual traveling operation section, a manual harvesting operation section, a manual threshing operation section, etc.) has received a manual turn-on or turn-off operation of a switch (e.g., a travel switch, a harvest switch, a thresh switch, etc.) for a predetermined procedure, or when the detected value detected by a sensor goes beyond a predetermined threshold.

The operation information transmission control section 242 is capable of determining maximum, minimum, and average values of detected value information and an occurrence count and durations of an event, for example, as detailed in the following.

The manual turn-off operation receiving section 242 and the data transmission section 242f shown in FIG. 8 will be detailed later.

Figure 9:
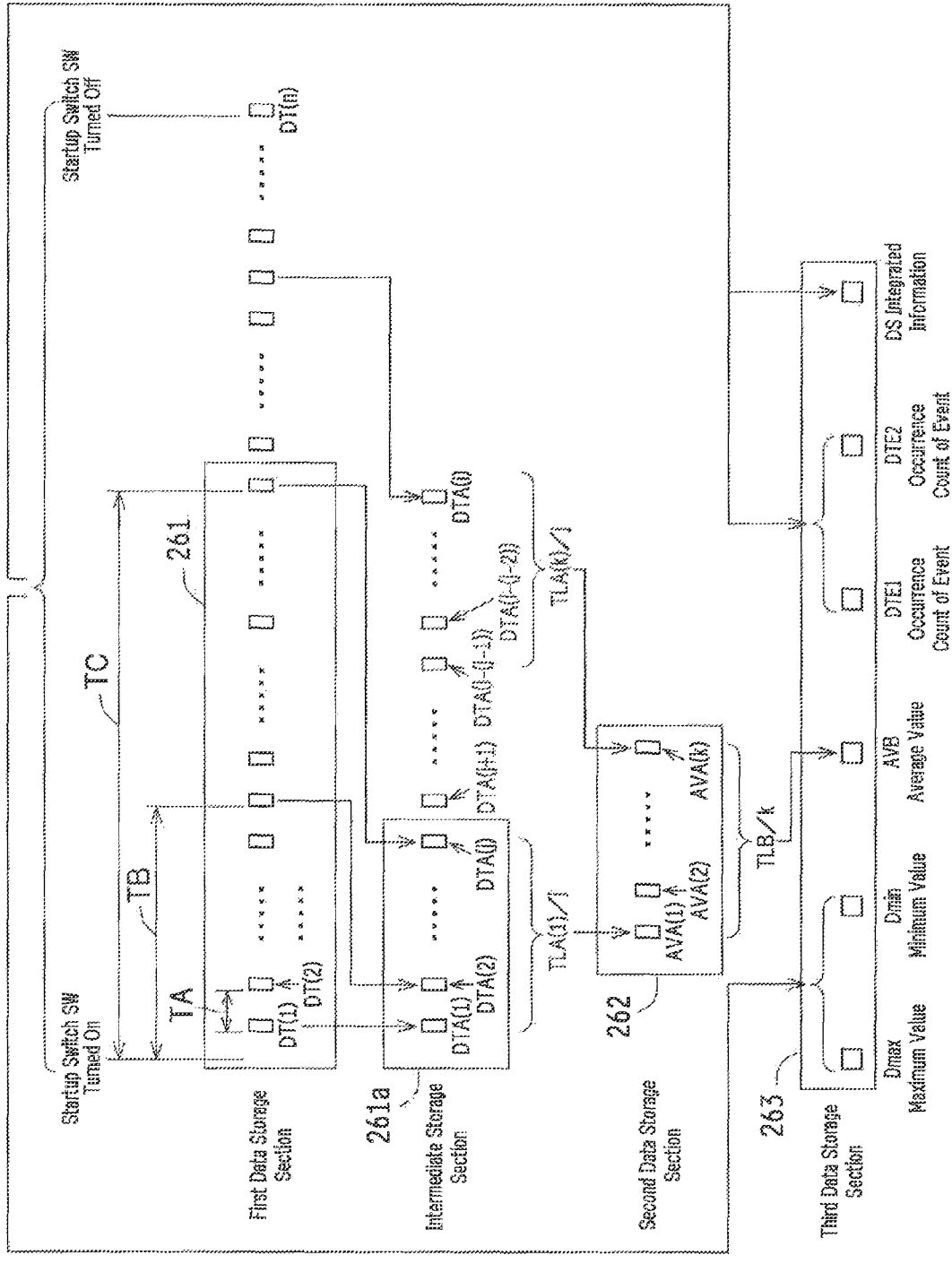
FIG. 9 is a diagram illustrating an exemplary operation for an operation information transmission control section to determine maximum, minimum, and average values of detected value information and an occurrence count and durations of an event.

FIG. 9 is a diagram illustrating an exemplary operation for the operation information transmission control section 242 to determine maximum, minimum, and average values of detected value information and an occurrence count and durations of an event.

In the exemplary operation of the operation information transmission control section 242 shown in FIG. 9, under the control of the first data storage control section 242b, the data acquisition section 242a temporarily stores data sets DT(1) to DT(n) (n is an integer greater than or equal to 2) in the first data storage section 261 at predetermined intervals TA (e.g., every 0.1 seconds) starting when the startup switch SW of the agricultural machine 110 is manually turned on. Accordingly, the first data storage section 261, under the control of the first data storage control section 242*b*, stores therein the cyclic binary information (specifically, contact point information and error presence/absence information) detected at the output elements (Qa, Qe, etc.) and the cyclic detected value information (specifically, rotational speed and engine load ratio of the engine 112, vehicle speed, error codes, board temperature, battery voltage, etc.) detected at the output elements (Qb, Qf, etc.). The first data storage section 261 further stores therein the cyclic integrated information (integrated time) detected at the output elements (Qc, etc.) and the cyclic error information detected at the output elements (Qd, etc.) under the control of the first data storage control section 242*b*.

To determine a maximum value in the detected value information (specifically, rotational speed and engine load ratio of the engine 112, vehicle speed, etc.), the data computation section 242*c* stores the detected value information detected at the output elements (Qb, Qf etc.) in the third data storage section 263 under the control of the second data storage control section 242*d* and compares the detected value information subsequently detected at the output elements (Qb, Qf etc.) with the detected value information stored in the third data storage section 263. If the detected value information detected at the output elements (Qb, Qf, etc.) is greater than the detected value information stored in the third data storage section 263, the data computation section 242*c* replaces the detected value information stored in the third data storage section 263 with the detected value information detected at the output elements (Qb, Qf, etc.) to update a maximum value Dmax.

To determine a minimum value in the detected value information, the data computation section 242*c* stores the detected value information detected at the output elements (Qb, Qf etc.) in the third data storage section 263 under the control of the second data storage control section 242*d* and compares the detected value information subsequently detected at the output elements (Qb, Qf, etc.) with the detected value information stored in the third data storage section 263. If the detected value information detected at the output elements (Qb, Qf etc.) is smaller than the detected value information stored in the third data storage section 263, the data computation section 242*c* replaces the detected value information stored in the third data storage section 263 with the detected value information detected at the output elements (Qb, Qf, etc.) to update a minimum value Dmin.

To calculate an average value of the detected value information, the data computation section 242*c* temporarily stores a predetermined number, j, (e.g., j=60) of latest sampling data sets (DTA(1) (=DT(1)), DTA(2) (=DT(11)), DTA(3) (=DT(21)), . . . , and DTA(i) (=DT(n−9)) (i=n/m)) in an intermediate storage section (specifically, ring buffer) 261*a* under the control of the second data storage control section 242*d*. The sampling data DTA(1) to DTA(i) is a subset of all the latest data sets DT(1) to DT(n) (n is an integer greater than or equal to 2) stored in the first data storage section 261 and made up of those cyclic data sets with an averaging interval TB which is a multiple of the predetermined interval TA. The multiplication factor, m, is an integer greater than or equal to 2 (e.g., m=10, TA=0.1 seconds, TB=TA×m=0.1 seconds×=1 second).

Next, the data computation section 242*c* calculates sums TLA(1) (=DTA(1)+. . . +DTA(j)), . . . , and TLA(k) (=DTA(i−(j−1))+. . . +DTA(i)) (k=i/j), each being a sum of a further subset of the subset (sampling data) DTA(1) to DTA(i) obtained by sampling the subset DTA(1) to DTA(i) at sampling intervals TC. The sampling interval TC is equal to the averaging interval TB times j, where j is an integer multiplication factor greater than or equal to 2 (e.g., j=60, TC=TB×j=1 second×60=1 minute). The data computation section 242*c* then divides the sums by the integer multiplication factor j (e.g., j=60) to obtain values TLA(1)/j, . . . , and TLA(k)/j as 1-minute average values AVA(1), . . . , and AVA(k). The data computation section 242*c* temporarily stores the obtained 1-minute average values AVA(1), . . . , and AVA(k) in the second data storage section 262 at the sampling intervals TC under the control of the second data storage control section 242*d*.

When the startup switch SW is manually turned off, the data computation section 242*c* calculates a total sum TLB of the 1-minute average values AVA(1), . . . , and AVA(k) stored in the second data storage section 262 and divides the total sum TLB by the number, k, of the 1-minute average values AVA(1), . . . , and AVA(k) to obtain a value TLB/k as an average value AVB. The obtained average value AVB is stored in the third data storage section 263 under the control of the second data storage control section 242*d*.

To calculate an occurrence count and durations of an event, the data computation section 242*c* stores a turn-on count (number of OFF-to-ON changes) DTE1 and a turn-on duration DTE2 available in the contact point information at the output elements (Qa, Qe, etc.) and a turn-on count DTE1 and a turn-on duration DTE2 available in the error presence/absence information at the output elements (Qa, Qe, etc.) in the third data storage section 263 under the control of the second data storage control section 242*d*. The data computation section 242*c* then adds a turn-on count and a turn-on duration available next in the contact point information and the error presence/absence information at the output elements (Qa, Qe, etc.) to the turn-on count DTE1 and the turn-on duration DTE2 stored in the third data storage section 263 for update.

The second data storage control section 242*d* stores an integrated time DS available at the output element Qc in the third data storage section 263 upon startups and shutdowns. The second data storage control section 242*d* also stores error information available at the output element Qd in the third data storage section 263 sequentially for a predetermined occurrence count starting from the first occurrence.

FIG. 10 is a schematic illustration of data structure in the third data storage section 263 for use by the operation information transmission control section 242.

As listed in FIG. 10, under the control of the second data storage control section 242*d*, the third data storage section 263 stores therein the turn-on count and turn-on duration obtained over a period from a manual turn-on to a manual turn-off of the startup switch SW is manually turned off as binary information (specifically, contact point information and error presence/absence information) and the maximum, minimum, and average values, as well as the integrated information, of the detected value information (specifically, rotational speed and engine load ratio of the engine 112, vehicle speed, etc.) obtained over a period from a manual turn-on to a manual turn-off of the startup switch SW is manually turned off.

The operation information transmission control section 242 (see FIG. 8) further operates as a work section containing a manual turn-off operation receiving section 242*e* and a data transmission section 242*f*. The manual turn-off operation receiving section 242*e* receives a manual turn-off operation of the startup switch SW of the agricultural machine 110. The data transmission section 242*f* transmits, to the remote monitoring device 130 via the communications section 210, the maximum, minimum, and average values, the occurrence count and durations of an event, and the integrated information, all stored in the third data storage section 263, when the manual turn-off operation receiving section 242e has received a manual turn-off operation of the startup switch SW. The data transmission section 242f further transmits, to the remote monitoring device 130 via the communications section 210, the location information and date and time stored in the location information storage section 233 when the manual turn-off operation receiving section 242e has received a manual turn-off operation of the startup switch SW.

When the startup switch SW is manually turned off power supply to the control section 240 is not turned off by the power supply control section 220. The power supply is turned off by the power supply control section 220 after the data transmission section 242f has transmitted the maximum, minimum, and average values, the occurrence count and durations of an event, and the integrated information, as well as the location information and date and time.

The third data storage section 263 stores therein operation information for a predetermined number of previous manual turn-on/off operations (e.g., for 30 manual turn-on/off operations). A pair of manual turn-on and turn-off operations of the startup switch SW is counted as a single manual turn-on/off operation.

Exemplary Operation of Operation Information Transmission Control Section

Next will be described an exemplary operation of the operation information transmission control section 242 in reference to FIGS. 11 and 12 which are flow charts respectively depicting the first and second halves of an exemplary operation of the operation information transmission control section 242.

Figure 11:
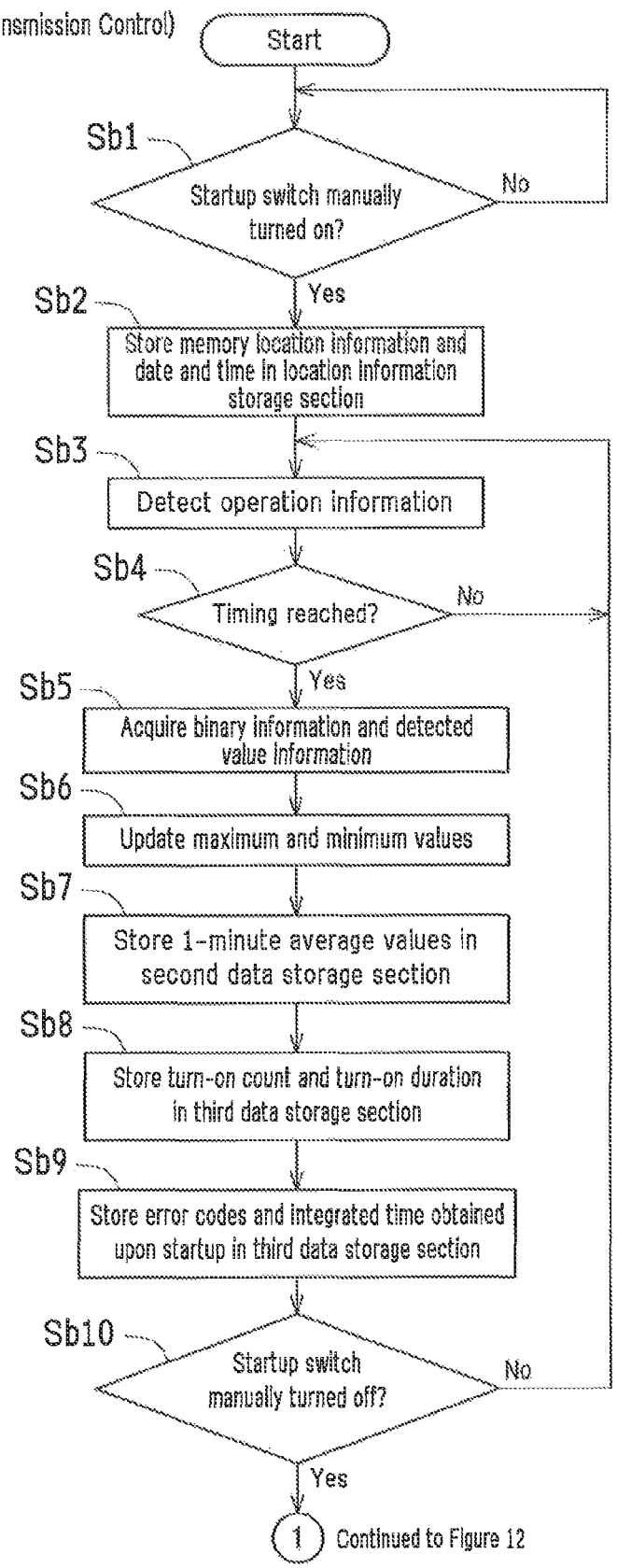
FIG. 11 is a flow chart depicting a first half of an exemplary operation of an operation information transmission control section.
Figure 12:
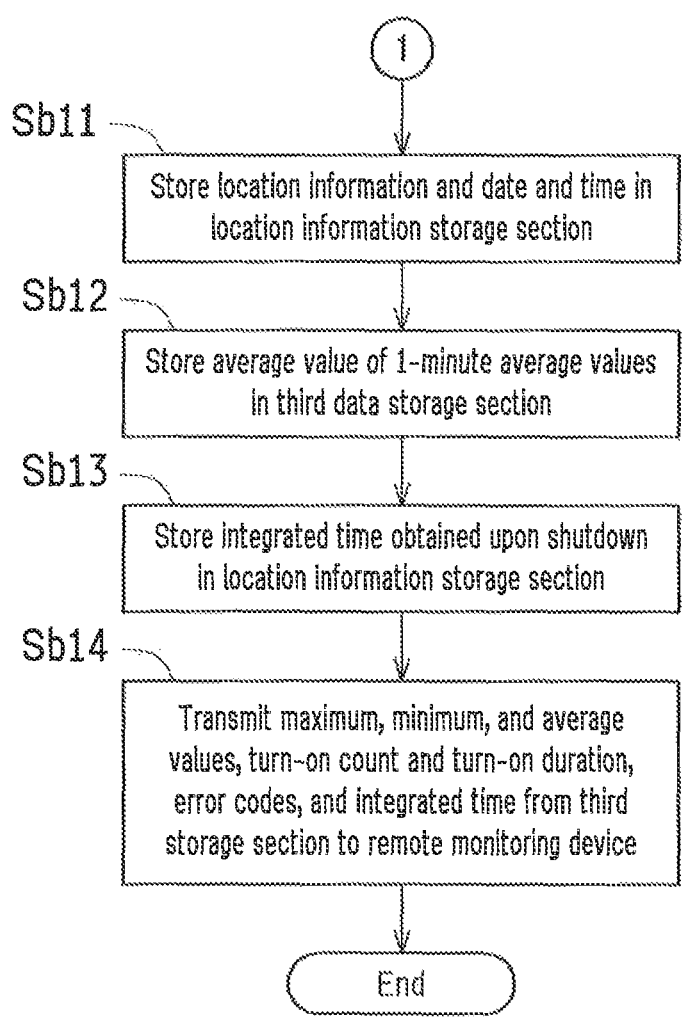
FIG. 12 is a flow chart depicting a second half of the exemplary operation of the operation information transmission control section.

According to the flow chart shown in FIG. 11, upon the startup switch SW being manually turned on (Yes in step Sb1), the GPS sensor 231 and the location detection section 232 (see FIG. 3) acquire the location information of the agricultural machine 110 and a date and time and store them in the location information storage section 233 (see FIG. 6) (step Sb2).

Next, the operation information of the agricultural machine 110 is detected at the output elements Q (step Sb3), and it is determined whether a timing has been reached in accordance with the predetermined intervals TA (in this example, TA=0.1 seconds) (step Sb4). If a timing has not been reached in accordance with the predetermined intervals TA (No in step Sb4), the process proceeds to step Sb3. On the other hand, if it is determined in step Sb4 that a timing has been reached in accordance with the predetermined intervals TA (Yes in step Sb4), the binary information and detected value information are acquired at the output elements Q (step Sb5). The maximum value Dmax and minimum value Dmin in the detected value information is updated in the third data storage section 263 (step Sb6). One-minute average values AV(1) to AV(k) of the detected value information are calculated and stored in the second data storage section 262 (step Sb7). The turn-on count DTE1 and turn-on duration DTE2 in the contact point information and error presence/absence information are added and stored in the third data storage section 263 (step Sb8). The error codes and integrated time DS obtained upon a startup are stored in the third data storage section 263 (step Sb9).

Next, it is determined whether the startup switch SW has been manually turned off (step Sb10). If the startup switch SW has not been manually turned off (No in step Sb10), the process proceeds to step Sb3. On the other hand, if it is determined in step Sb10 that the startup switch SW has been manually turned off (Yes in step Sb10), the GPS sensor 231 and the location detection section 232 (see FIG. 3) acquire the location information of the agricultural machine 110 and a date and time and store them in the location information storage section 233 (see FIG. 6) (step Sb11), followed by the calculation of the average value AVB of the individual 1-minute average values AV(1) to AV(k) stored in the second data storage section 262 and the storing of the average value AVB in the third data storage section 263 (step Sb12), as illustrated in FIG. 12.

Next, the integrated time DS obtained upon a shutdown is stored in the third data storage section 263 (step Sb13). The maximum value Dmax, minimum value Dmin, and average value AVB, the turn-on count DTE1 and turn-on duration DTE2 in the contact point information and error presence/absence information, and the error codes and integrated time DS obtained upon startups and shutdowns, all stored in the third data storage section 263, are transmitted to the remote monitoring device 130 (step Sb14), which ends the process. When the process is ended, the location information and date and time obtained upon startups and shutdowns and stored in the location information storage section 233 are transmitted to the remote monitoring device 130.

The operation information transmitting function described above enables transmission to the remote monitoring device 130 of the data needed to inform the user of the operation state, including the minimum, maximum, average values, and integrated information of the data on the operation state of the agricultural machine 110 collected over a period from a startup to the latest data acquisition, and the occurrence count and durations of a predetermined event, when the startup switch SW of the agricultural machine 110 is manually turned off. Therefore, the user is capable of being informed of the operation state, including the maximum, minimum, and average values for each sensor of the agricultural machine 110 and the turn-on count of the switch of the agricultural machine 110. Accordingly, the user is enabled to exploit the stored information to manage the operation of the agricultural machine 110 over an extended period of time (e.g., daily job reports, scheduled maintenance, information on actual use in the field, and diagnosis of parts through analysis of long-term data (aging degradation)). In addition, because the operation information, which is an abridged version of the detected value information, such as the maximum, minimum, and average values, the occurrence count and durations of an event, and the integrated information, is transmitted to the remote monitoring device 130 under the control of the operation information transmission control section 242, data can be easily collected in the remote monitoring device 130 for analysis. Another advantage is reduction of the storage capacity of a storage section (not shown) in the remote monitoring device 130 and of the communications load on the communications network 140.

Event Information Transmitting Function

Figure 13:
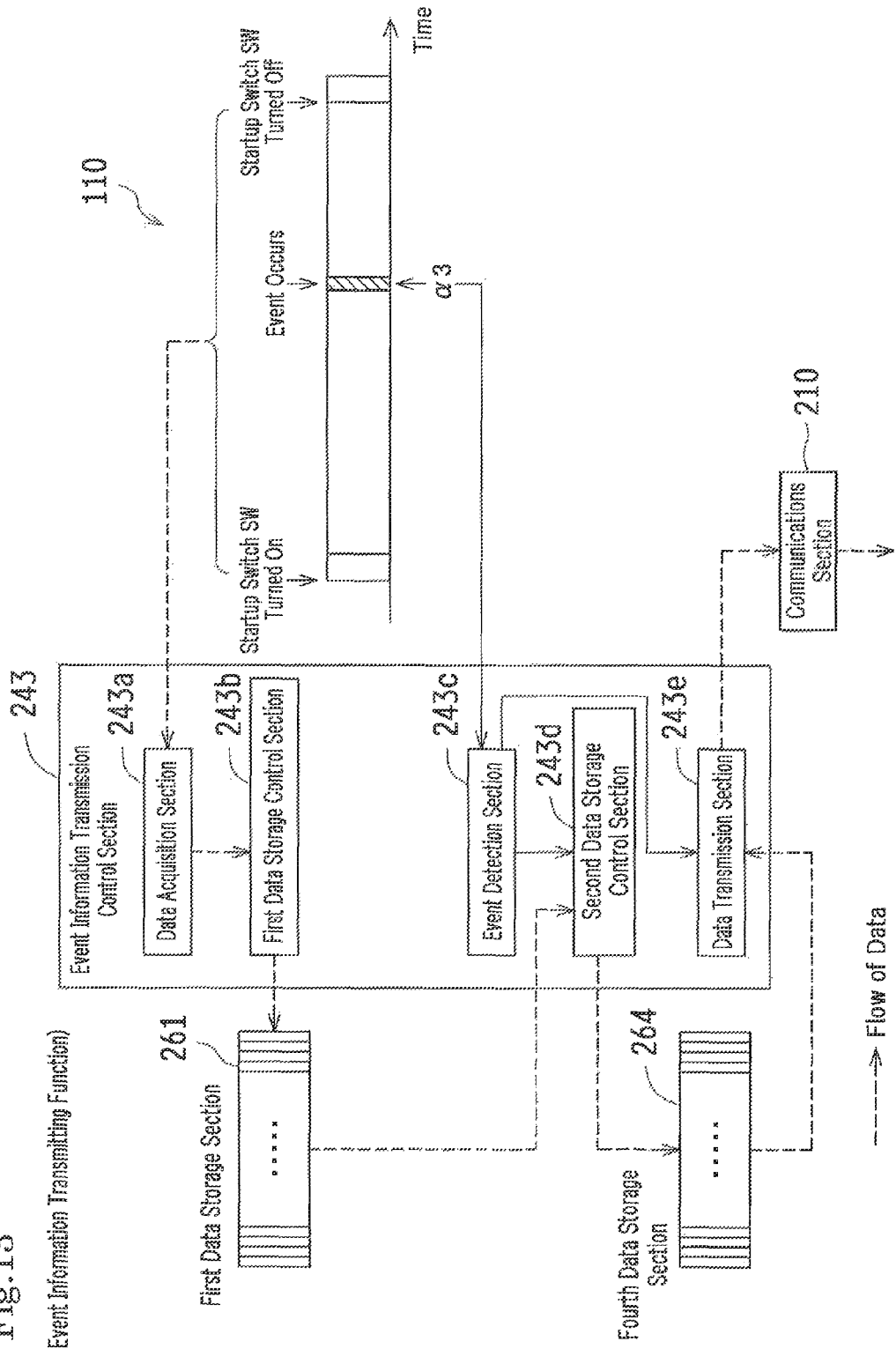
FIG. 13 is a schematic operation diagram of an operation process for an event information transmitting function implemented by an event information transmission control section in a control section.

FIG. 13 is a schematic operation diagram of an operation process for an event information transmitting function implemented by the event information transmission control section 243 in the control section 240. The GPS sensor 231, the location detection section 232, and the location information storage section 233 are omitted in FIG. 13.

The control section 240 includes the event information transmission control section (exemplary data storage control section) 243 for transmitting event information to the remote monitoring device 130 when a predetermined event has occurred (denoted by α3 in FIG. 13).

Specifically, the event information transmission control section 243 operates as a work section containing a data acquisition section 243a, a first data storage control section 243b, an event detection section 243c, and a second data storage control section 243d. The data acquisition section 243a acquires, at predetermined intervals TA (e.g., every 0.1 seconds), a data set (see FIGS. 4 and 6) on the operation state of the agricultural machine 110 fed via the connection terminals T. The first data storage control section 243b temporarily stores in the first data storage section (specifically, ring buffer) 261a predetermined number of latest data sets (points in time) (e.g., 600 sets (points in time)) in the cyclic data acquired by the data acquisition section 243a at the predetermined intervals. The event detection section 243c detects an occurrence of a predetermined event in the agricultural machine 110. The second data storage control section 243d stores a predetermined number of data sets (points in time) (specifically, 600 sets (points in time)), including a data set obtained upon the occurrence of the predetermined event, in the fourth data storage section 264 when a predetermined event has occurred as detected by the event detection section 243c.

The predetermined number of data sets (points in time), including the data set obtained upon the occurrence of the predetermined event, stored in the fourth data storage section 264 when the predetermined event has occurred may contain the data set obtained upon the occurrence of the predetermined event and stored in the fourth data storage section 264 as the data stored in the latest memory location (the latest data), the data stored in the oldest memory location (the oldest data), or the data stored in a memory location between the latest and oldest memory locations (data obtained between the latest data and the oldest data). If the data set obtained upon the occurrence of the predetermined event is stored as the data stored in the oldest memory location or the data stored in a memory location between the latest and oldest memory locations, the second data storage control section 243d stores necessary data sets (points in time) in the fourth data storage section 264 after the occurrence of the predetermined event.

The memory location settings for the data set obtained upon the occurrence of the predetermined event may be changeable. When this is the case, the memory location settings for the data set obtained upon the occurrence of the predetermined event may be changed in the remote monitoring terminal device 200 or in the remote monitoring device 130. The remote monitoring terminal device 200 may be capable of accepting or rejecting an instruction from the remote monitoring device 130 for a change in value settings for the memory location for the data set obtained upon the occurrence of the predetermined event.

The event information contains the cyclic location information (specifically, longitude and latitude) of the agricultural machine 110 with the predetermined interval, the date and time (specifically, year, month, day, hour, minute, and second according to the international standard Gregorian calendar), the cyclic binary information (specifically, contact point information and error presence/absence information) with the predetermined interval TA, the cyclic detected value information (specifically, rotational speed and engine load ratio of the engine 112, vehicle speed, error codes, board temperature, battery voltage, etc.) with the predetermined interval, the cyclic integrated information with the predetermined interval, and the cyclic error information with the predetermined interval. The location information may contain the velocity and orientation of the agricultural machine 110.

In other words, the first data storage section 261 stores therein, as instant data obtained at the predetermined intervals TA, the location information and date and time, the binary information (specifically, contact point information and error presence/absence information), the detected value information (specifically, rotational speed and engine load ratio of the engine 112, vehicle speed, error codes, board temperature, battery voltage, etc.), the integrated information, and the error information.

The "predetermined interval TA" here has the same definition as the predetermined interval TA described in connection with the operation information transmitting function. Its detailed description is omitted.

An "occurrence of a predetermined event" has the same definition as an occurrence of an event described in connection with the operation information transmitting function. Its detailed description is omitted.

The event information transmission control section 243 operates as a work section containing a data transmission section 243e for transmitting, to the remote monitoring device 130 via the communications section 210, information indicating a predetermined event detected by the event detection section 243c and all the predetermined number of data sets (points in time) stored in the fourth data storage section 264.

The fourth data storage section 264 stores therein event information for a predetermined number of previous manual turn-on/off operations (e.g., for 4 manual turn-on/off operations. A pair of manual turn-on and turn-off operations of the startup switch SW is counted as a single manual turn-on/off operation.

Exemplary Operation of Event Information Transmission Control Section

Next will be described an exemplary operation of the event information transmission control section 243 in reference to FIGS. 14 and 15 which are flow charts respectively depicting the first and second halves of an exemplary operation of the event information transmission control section 243. In the present embodiment, the first data storage section 261 is used, as mentioned previously, as a ring buffer in which data is stored in storage areas arranged in series, both ends of the buffer being logically linked so that the buffer can be handled like a ring.

Figure 14:
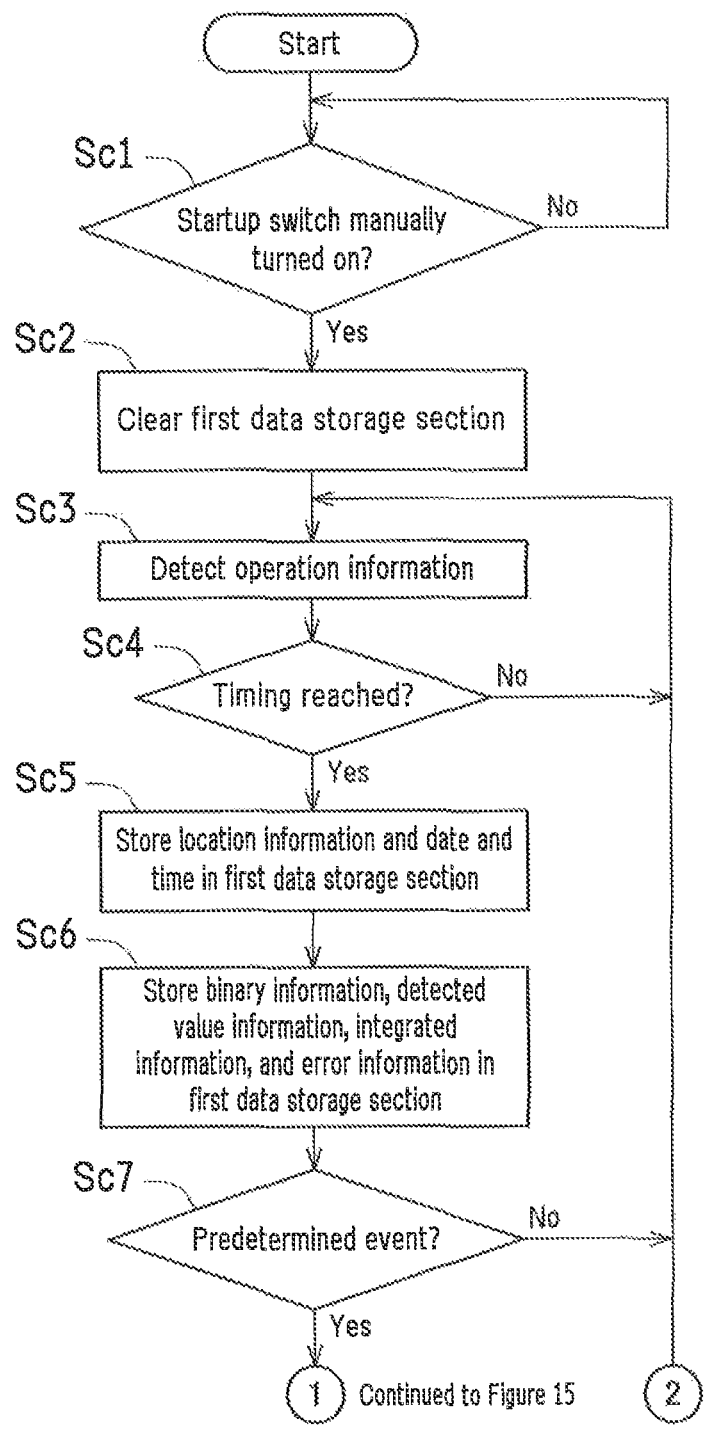
FIG. 14 is a flow chart depicting a first half of an exemplary operation of an event information transmission control section.

According to the flow chart shown in FIG. 14, upon the startup switch SW being manually turned on (Yes in step Sc1), the first data storage section 261 used as a ring buffer is all cleared (step Sc2).

Next, the operation information of the agricultural machine 110 is detected at the output elements Q (step Sc3), and it is determined whether a timing has been reached in accordance with the predetermined intervals TA (in this example, TA=0.1 seconds) (step Sc4). If a timing has not been reached in accordance with the predetermined intervals TA (No in step Sc4), the process proceeds to step Sc3. On the other hand, if it is determined in step Sc4 that a timing has been reached in accordance with the predetermined intervals TA (Yes in step Sc4), the location information of the agricultural machine 110 and a date and time are acquired by the GPS sensor 231 and the location detection section 232 (see FIG. 3) and stored in the first data storage section 261 (step Sc5). Binary information, detected value information, integrated information, and error information are acquired at the output elements Q and stored in the first data storage section 261 (step Sc6).

Next, it is determined whether a predetermined event has occurred (step Sc7). If no predetermined event has occurred (No in step Sc7), the process proceeds to step Sc3. On the other hand, if it is determined in step Sc7 that a predetermined event has occurred (Yes in step Sc7), a predetermined number of sets (e.g., 600 sets) of location information, date and time, binary information, detected value information, integrated information, and error information are acquired from the first data storage section 261 (step Sc8). The acquired, predetermined number of sets of location information, date and time, binary information, detected value information, integrated information, and error information are stored in the fourth data storage section 264 (step Sc9). The predetermined number of sets of location information, date and time, binary information, detected value information, integrated information, and error information stored in the fourth data storage section 264, together with information indicating the predetermined event, are transmitted to the remote monitoring device 130 (step Sc10), as illustrated in FIG. 15.

Next, it is determined whether the startup switch SW has been manually turned off (step Sc11). If the startup switch SW has not been manually turned off (No in step Sc11), the process proceeds to step Sc3 shown in FIG. 14. On the other hand, if it is determined in step Se11 that the startup switch SW has been manually turned off (Yes in step Sc11), the process is ended.

The event information transmitting function described above enables transmission to the remote monitoring device 130 of the data needed to precisely inform the user of the operation state of the agricultural machine 110 in which a predetermined event has occurred, such as a predetermined number of data sets (points in time) including the data set obtained upon the occurrence of a predetermined event, when the predetermined event has occurred. Therefore, when the predetermined event has occurred in the agricultural machine 110, the user is capable of being precisely informed of the operation state of the agricultural machine 110 in which the predetermined event has occurred. For example, if an irregularity is detected in the agricultural machine 110 (i.e., when a predetermined event has occurred), the user is capable of being precisely informed of the operation state of the agricultural machine 110 as of the time of detection of the irregularity. As another example, if a manual operation switch (specifically, manual travel operation switch, manual harvest operation switch, and manual thresh operation switch) through which the agricultural machine 110 is instructed to do a predetermined operation has been manually turned on or turned off (i.e., when a predetermined event has occurred), the user is capable of being precisely informed of the operation state of the agricultural machine 110 as of the time of the manual turn-on or turn-off of the manual operation switch. Accordingly, when a predetermined event (especially, irregularity or like inconvenience) has occurred, the user is capable of being immediately informed of the occurrence, hence capable of quickly responding to the predetermined event (especially, irregularity or like inconvenience). Furthermore, the user is enabled to analyze the operation state of the agricultural machine 110 in detail before, after, and both before and after a predetermined event occurs. The detailed analysis effectively contributes to the investigation of causes of the predetermined event.

The transmitting section 243c may, when a predetermined event has occurred, transmit to the remote monitoring device 130 information indicating the predetermined event and any single one of the predetermined number of data sets (points in time) stored in the first data storage section 261 (e.g., data set obtained upon the occurrence of the event), and in response to the remote monitoring device 130 requesting transmission of the predetermined number of data sets (points in time) stored in the first data storage section 261 on the basis of that single data set, transmit all the predetermined number of data sets (points in time) stored in the first data storage section 261 to the remote monitoring device.

Figure 15:
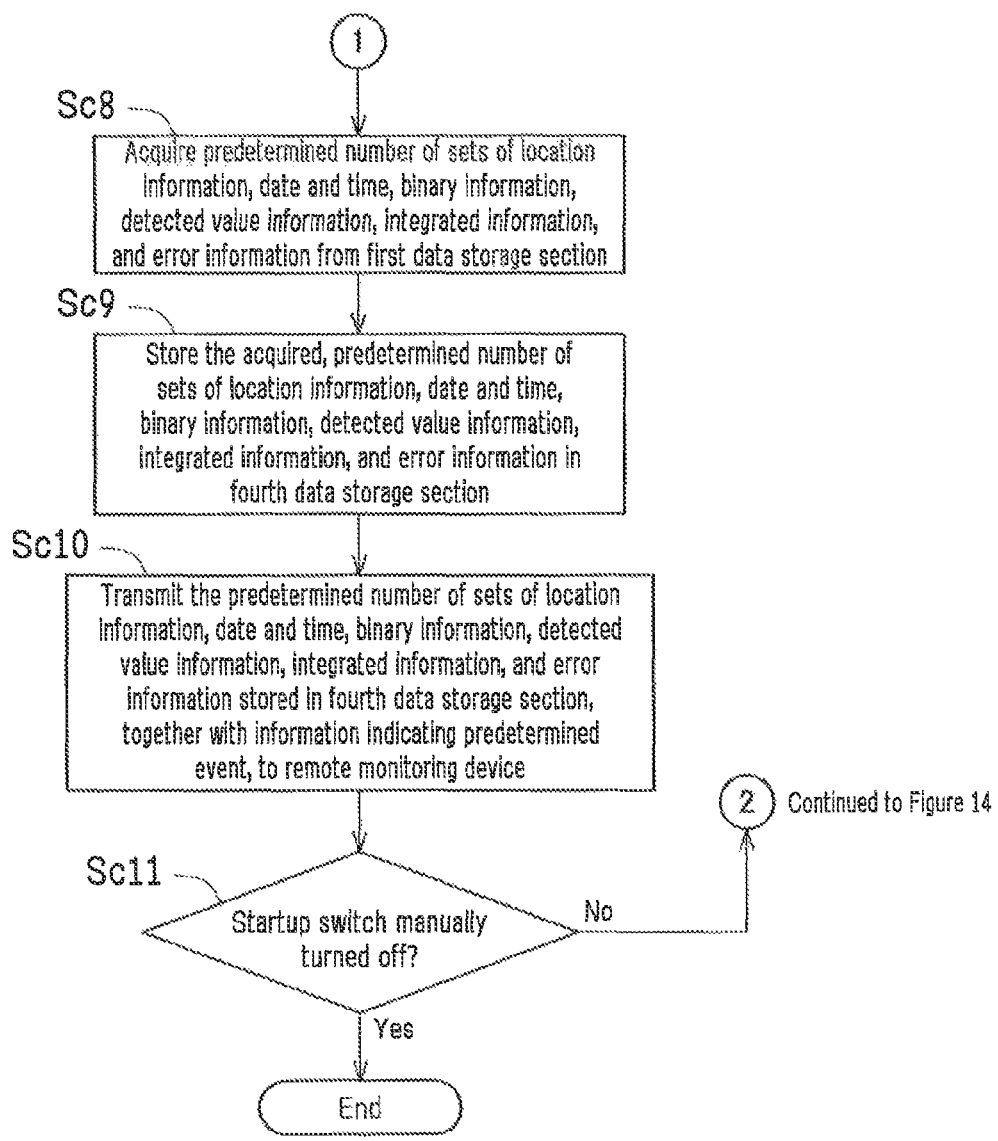
FIG. 15 is a flow chart depicting a second half of the exemplary operation of the event information transmission control section.
Figure 16:
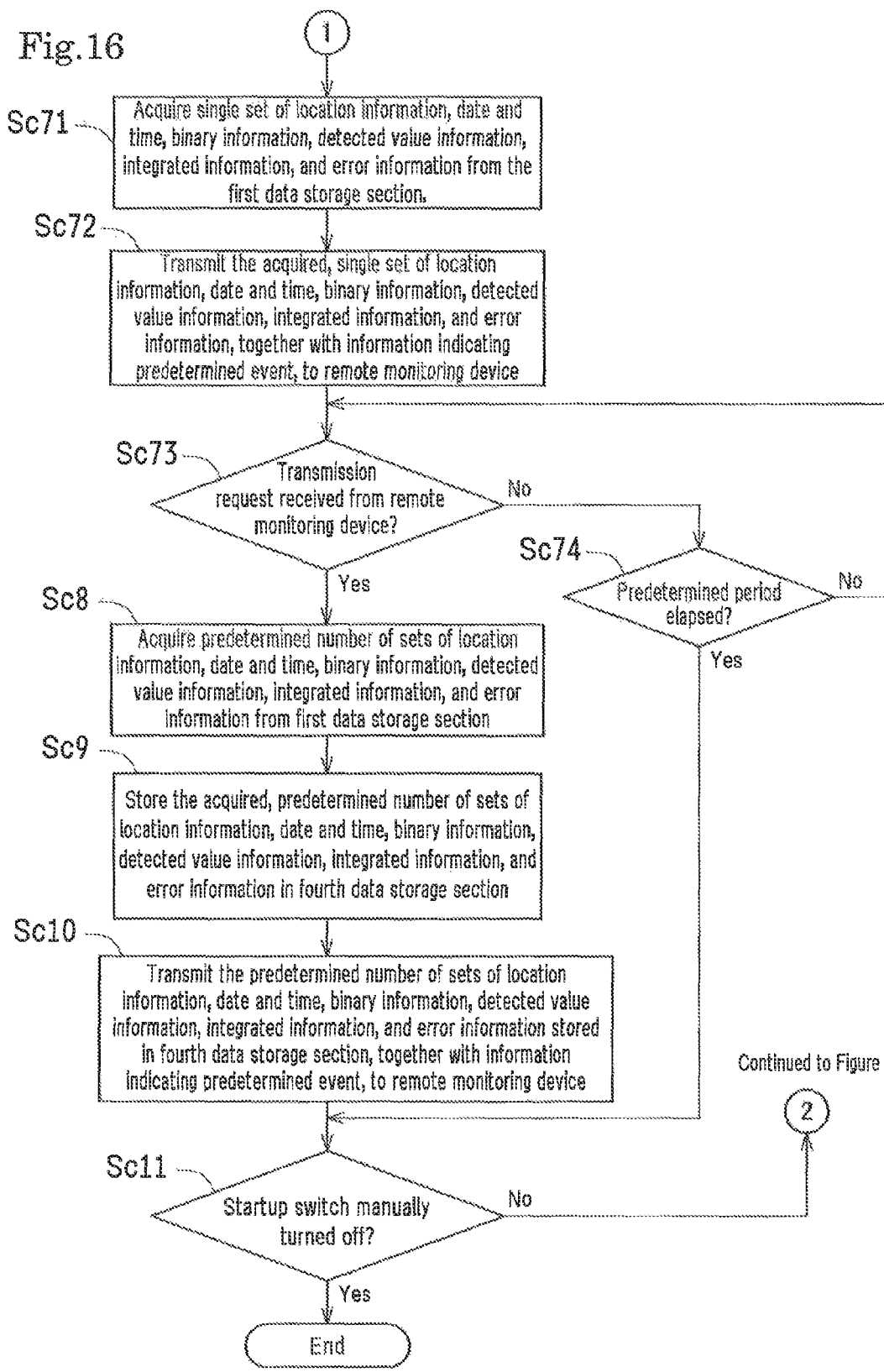
FIG. 16 is a flow chart depicting another exemplary operation of an event information transmission control section, in addition to those shown in FIGS. 14 and 15.

FIG. 16 is a flow chart depicting another exemplary operation of an event information transmission control section 243, in addition to those shown in FIGS. 14 and 15.

The flow chart shown in FIG. 16 depicts steps Sc71 to Sc74 which precedes step Sc8 in the exemplary operation of the event information transmission control section 243 shown in FIG. 15.

According to the flow chart shown in FIG. 16, if a predetermined event has occurred in step Sc7 shown in FIG. 14 (Yes in step Sc7), any single set of location information (e.g., the set obtained when a predetermined event has occurred) in the predetermined number of sets (in this example, 600 sets) of location information, as well as the date and time, binary information, detected value information, integrated information, and error information, is acquired from the first data storage section 261 (step Sc71). The acquired, single set of location information, date and time, binary information, detected value information, integrated information, and error information, together with information indicating the predetermined event, are transmitted to the remote monitoring device 130 (step Sc72).

Next, it is determined whether a transmission request for a predetermined number of data sets (points in time) has been received from the remote monitoring device 130 (step Sc73). If no transmission request has been received (No in step Sc73) and a predetermined period has elapsed (Yes in step Sc74), the process proceeds to step Sc11. On the other hand, a transmission request has been received (Yes in step Sc73) within the predetermined period (No in step Sc74), the same process as step Sc8 and the subsequent steps shown in FIG. 15 are carried out.

In the exemplary operation of the event information transmission control section 243 shown in FIG. 16, all the predetermined number of data sets (points in time) stored in the first data storage section 261 can be transmitted, if necessary in the remote monitoring device 130, to the remote monitoring device 130 on the basis of a single data set in the predetermined number of data sets (points in time) stored in the first data storage section 261.

Trend Information Transmitting Function

Figure 17:
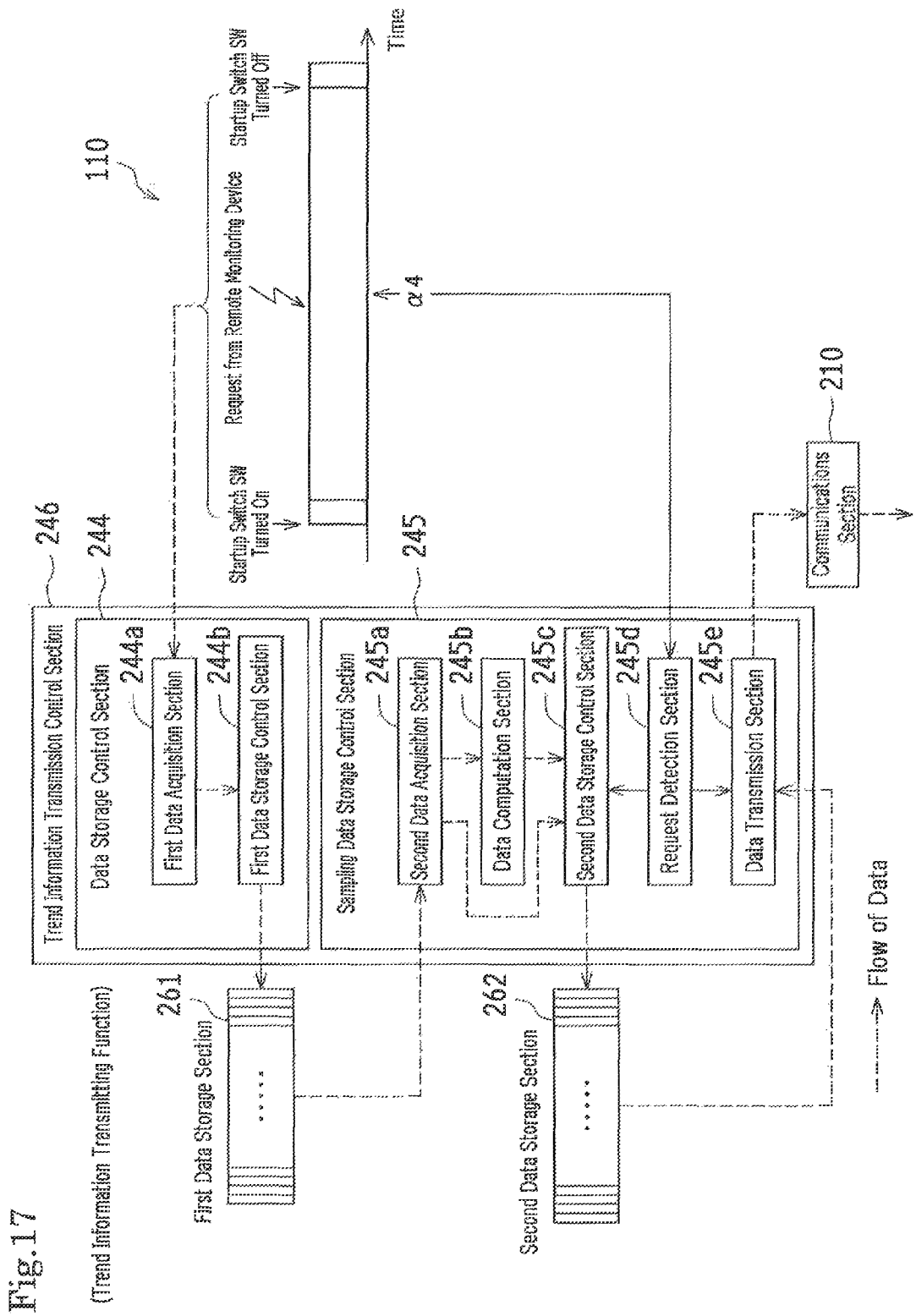
FIG. 17 is a schematic operation diagram of an operation process for a trend information transmitting function implemented by a trend information transmission control section in a control section.

FIG. 17 is a schematic operation diagram of an operation process for a trend information transmitting function implemented by a trend information transmission control section 246 in the control section 240. The GPS sensor 231, the location detection section 232, and the location information storage section 233 are omitted in FIG. 17.

The control section 240 includes a trend information transmission control section 246 containing a data storage control section 244 for temporarily storing event information in the first data storage section 261 and a sampling data storage control section 245 for transmitting all the sampling data stored in the second data storage section 262 to the remote monitoring device 130 when a request has been received from the remote monitoring device 130 (denoted by α4 in FIG. 17).

Specifically, the data storage control section 244 operates as a work section containing a first data acquisition section 244a for acquiring, at predetermined intervals TA (e.g., every 0.1 seconds), a data set (see FIGS. 4 and 6) on the operation state of the agricultural machine 110 fed via the connection terminals T and a first data storage control section 244b for temporarily storing in the first data storage section (specifically, ring buffer) 261a predetermined number of latest data sets (points in time) (e.g., 600 sets) in the cyclic data acquired by the first data acquisition section 244a at the predetermined intervals.

The sampling data storage control section 245 operates as a work section containing a second data acquisition section 245a, a data computation section 245b, and a second data storage control section 245c. The second data acquisition section 245a acquires data (specifically, location information, date and time, binary information, detected value information, integrated information, and error information) from the predetermined number of data sets (e.g., 600 sets (points in time)) stored in the first data storage section 261 by sampling at sampling intervals TC (e.g., every 1 minute) each of which is equal to the predetermined interval TA (e.g., 0.1 seconds) times an integer greater than or equal to 2 (e.g., 600). The data computation section 245*b* computes an average value of those sets of the sampling data, acquired by the second data acquisition section 245*a*, for which an average value is to be computed (specifically, an average value of the detected value information, such as rotational speed and engine load ratio of the engine 112, and vehicle speed). The second data storage control section 245*c* temporarily stores the sampling data acquired by the second data acquisition section 245*a* (specifically, binary information, detected value information, integrated information, and error information) and the average value of the sampling data computed by the data computation section 245*b* (specifically, an average value of the detected value information, such as rotational speed and engine load ratio of the engine 112, and vehicle speed) in the second data storage section 262.

The trend information contains the cyclic location information (specifically, longitude and latitude) of the agricultural machine 110 with the sampling interval TC, the date and time (specifically, year, month, day, hour, minute, and second according to the international standard Gregorian calendar), the cyclic binary information with the sampling interval TC, the detected value information, the average value of the detected value information, the integrated information, and the error information. The location information may contain the velocity and orientation of the agricultural machine 110.

The "predetermined interval TA" here has the same definition as the predetermined interval TA described in connection with the operation information transmitting function. Its detailed description is omitted.

The average value of the sampling data (specifically, detected value information) may be calculated by the trend information transmission control section 246 in the following manner.

The request detection section 245*d* and the data transmission section 245*e* shown in FIG. 17 will be detailed later.

Figure 18:
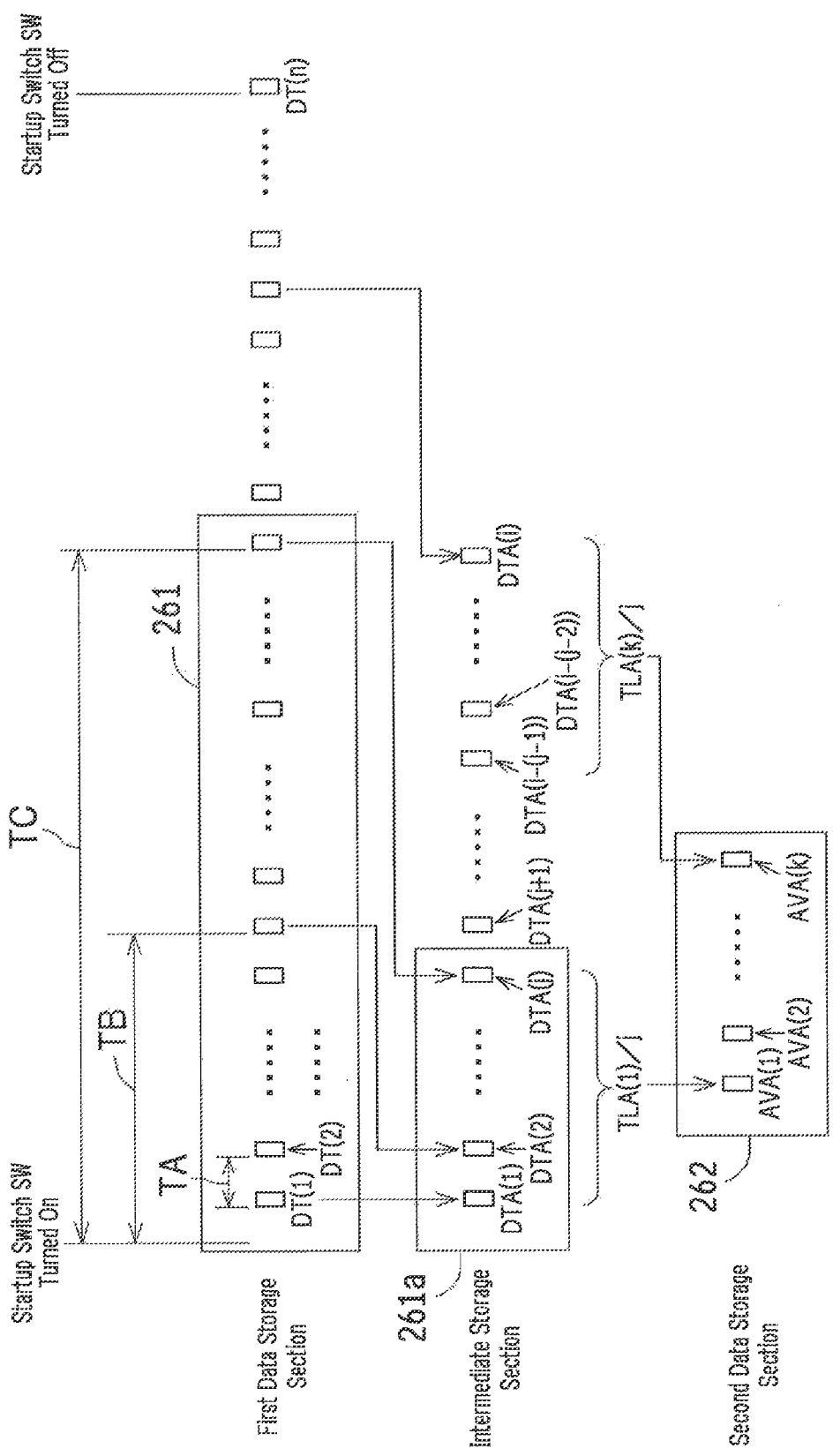
FIG. 18 is a diagram illustrating an exemplary calculation for a trend information transmission control section to calculate an average value.

FIG. 18 is a diagram illustrating an exemplary calculation for the trend information transmission control section 246 to calculate an average value.

In the exemplary calculation by the trend information transmission control section 246 shown in FIG. 18, under the control of the first data storage control section 244*b* in the data storage control section 244, the data acquisition section 244*a* temporarily stores data sets DT(1) to DT(n) (n is an integer greater than or equal to 2) in the first data storage section 261 at the predetermined intervals TA (e.g., every 0.1 seconds) starting when the startup switch SW of the agricultural machine 110 is manually turned on. Accordingly, the first data storage section 261, under the control of the first data storage control section 244*b*, stores therein the cyclic binary information (specifically, contact point information and error presence/absence information) detected at the output elements (Qa, Qe, etc.) and the cyclic detected value information (specifically, rotational speed and engine load ratio of the engine 112, vehicle speed, error codes, board temperature, battery voltage, etc.) detected at the output elements (Qb, Qf, etc.). The first data storage section 261 further stores therein the cyclic integrated information (integrated time) detected at the output elements (Qc, etc.) and the cyclic error information detected at the output elements (Qd, etc.) under the control of the first data storage control section 244*b*.

Next, in the sampling data storage control section 245, the data computation section 245*b* temporarily stores a predetermined number, j, (e.g., j=60) of latest sampling data sets (DTA(1) (=DT(1)), DTA(2) (=DT(11)), DTA(3) (=DT(21)), . . . , and DTA(i) (=DT(n−9)) (i=n/m)) in the intermediate storage section (specifically, ring buffer) 261*a* under the control of the second data storage control section 245*c*. The sampling data DTA(1) to DTA(i) is a subset of all the data sets DT(1) to DT(n) (n is an integer greater than or equal to 2) acquired by the second data acquisition section 245*a* from the first data storage section 261 and made up of those cyclic data sets with an averaging interval TB which is a multiple of the predetermined interval TA. The multiplication factor, m, is an integer greater than or equal to 2 (e.g., m=10, TA=0.1 seconds, TB=TA×m=0.1 seconds×10=1 second).

Next, the data computation section 245*b* calculates sums TLA(1) (=DTA(1)+. . . +DTA(j)), . . . , and TLA(k) (=DTA(i−(j−1))+. . . +DTA(i)) (k=i/j), each being a sum of a further subset of the subset (sampling data) DTA(1) to DTA(i) obtained by sampling the subset DTA(1) to DTA(i) at sampling intervals TC. The sampling interval TC is equal to the averaging interval TB times j, where j is an integer multiplication factor greater than or equal to 2 (e.g., j=60, TC=TB× j=1 second×60=1 minute). The data computation section 245*b* then divides the sums by the integer multiplication factor j (e.g., j=60) to obtain values TLA(1)/j, . . . , and TLA(k)/jas 1-minute average values AVA(1), . . . , and AVA (k). The data computation section 245*b* temporarily stores the obtained 1-minute average values AVA(1), . . . , and AVA(k) in the second data storage section 262 at the sampling intervals TC under the control of the second data storage control section 245*c*.

The sampling data storage control section 245 may selectively switch between the average value storing operation where 1-minute average values are stored in the second data storage section 262 at the sampling intervals TC and the instant data storing operation where detected value information of instant data is stored in the second data storage section 262 at the sampling intervals TC.

Under the control of the second data storage control section 245*c*, the second data storage section 262 stores therein the binary information (specifically, contact point information and error presence/absence information), detected value information (specifically, rotational speed and engine load ratio of the engine 112, vehicle speed, error codes, board temperature, battery voltage, etc.), integrated information, and error information as the instant data obtained at the sampling intervals TC.

The sampling data storage control section 245 also operates as a work section containing a request detection section 245*d* for detecting a request from the remote monitoring device 130 and a data transmission section 245*e* for transmitting the sampling data stored in the second data storage section 262 to the remote monitoring device 130 via the communications section 210 upon either the request detection section 245*d* receiving a request from the remote monitoring device 130 or at an end of the work (specifically, when the startup switch SW is manually turned off) or both (in this example, upon both occasions).

The size of a single data set stored in the second data storage section 262 at the sampling intervals TC (specifically, every 1 minute) is such that a predetermined number of sets (points in time) (specifically, 720 data sets (points in time)) can be stored therein.

The second data storage section 262 stores therein trend information for a predetermined number of previous manual turn-on/off operations (e.g., for a single manual turn-on/off operation). A pair of manual turn-on and turn-off operations of the startup switch SW is counted as a single manual turn-on/off operation.

Settings for the averaging interval TB, the sampling interval TC, and the switching between the average value storing operation and the instant data storing operation may be changeable. When this is the case, the settings for the averaging interval TB, the sampling interval TC, and the switching between the average value storing operation and the instant data storing operation may be changed in the remote monitoring terminal device 200 or in the remote monitoring device 130. In addition, the remote monitoring terminal device 200 may be capable of accepting or rejecting an instruction from the remote monitoring device 130 for a change in the value settings for the averaging interval TB, the sampling interval TC, and the switching between the average value storing operation and the instant data storing operation.

In the present embodiment, when the data storage count for the first data storage section 261 has reached a predetermined value (e.g., the value equivalent to a storage capacity), the data transmission section 245e transmits all the predetermined number of data sets (points in time) stored in the first data storage section 261 to the remote monitoring device 130 via the communications section 210 and initializes the data storage count (specifically, the data storage count is set to 0).

Exemplary Operation of Trend Information Transmission Control Section

Next will be described an exemplary operation of the trend information transmission control section 246 in reference to FIGS. 19 and 20 which are flow charts respectively depicting the first and second halves of an exemplary operation of the trend information transmission control section 246. In the present embodiment, the first data storage section 261 is used, as mentioned previously, as a ring buffer in which data is stored in storage areas arranged in series, both ends of the buffer being logically linked so that the buffer can be handled like a ring.

According to the flow chart shown in FIG. 19, upon the startup switch SW being manually turned on (Yes in step Sd1), the data storage count for the first data storage section 261 is set to 0, and the first data storage section 261 used as a ring buffer is all cleared (step Sd2).

Next, the operation information of the agricultural machine 110 is detected at output elements Q (step Sd3), and it is determined whether a timing has been reached in accordance with the predetermined intervals TA (in this example, TA=0.1 seconds) (step Sd4). If a timing has not been reached in accordance with the predetermined intervals TA (No in step Sd4), the process proceeds to step Sd3. On the other hand, if it is determined in step Sd4 that a timing has been reached in accordance with the predetermined intervals TA (Yes in step Sd4), the GPS sensor 231 and the location detection section 232 (see FIG. 3) acquire the location information of the agricultural machine 110 and a date and time and store them in the first data storage section 261 (step Sd5). Binary information, detected value information, integrated information, and error information are acquired at the output elements and stored in the first data storage section 261 (step Sd6). At the same time, 1 is added to the data storage count.

Next, it is determined whether a timing has been reached in accordance with the sampling intervals TC (in this example, TC=1 minute) (step Sd7). If a timing has not been reached in accordance with the sampling intervals TC (No in step Sd7), the process proceeds to step Sd3. On the other hand, if it is determined in step Sd7 that a timing has been reached in accordance with the sampling intervals TC (Yes in step Sd7), cyclic binary information with the sampling interval TC, detected value information, integrated information, and error information (sampling data) are acquired from the predetermined number of data sets (points in time) (in this example, 600 sets (points in time)) stored in the first data storage section 261 (step Sd8). An average value of the detected value information (an average value of the sampling data) is calculated (step Sd9). The acquired sampling data and the calculated average value of the sampling data are stored in the second data storage section 262 (step Sd10).

Next, as illustrated in FIG. 20, it is determined whether a request has been received from the remote monitoring device 130 (step Sd11). If a request has been received from the remote monitoring device 130 (Yes in step Sd11), the sampling data and the average value of the sampling data stored in the second data storage section 262 are all transmitted to the remote monitoring device 130 (step Sd12).

It is then determined whether the startup switch SW has been manually turned off (step Sd13). If the startup switch SW has not been manually turned off (No in step Sd13), the process proceeds to step Sd2 shown in FIG. 19. On the other hand, if it is determined in step Sd13 that the startup switch SW has been manually turned off (Yes in step Sd13), the sampling data and the average value of the sampling data stored in the second data storage section 262 are all transmitted to the remote monitoring device 130 (step Sd14), which ends the process.

On the other hand, if it is determined in step Sd11 that no request has been received from the remote monitoring device 130 (No in step Sd11), it is determined whether the data storage count for the first data storage section 261 has reached a predetermined value (in this example, the value equivalent to a storage capacity) (step Sd14). If the data storage count for the first data storage section 261 has not reached the predetermined value (No in step Sd14), the process proceeds directly to step Sd13. On the other hand, if it is determined in step Sd14 that the data storage count for the first data storage section 261 has reached the predetermined value (Yes in step Sd14), the data storage count for the first data storage section 261 is set to 0, and all the predetermined number of data sets (points in time) stored in the first data storage section 261 are transmitted to the remote monitoring device 130 (step Sd15). The process then proceeds to step Sd13.

In the flow charts of FIGS. 19 and 20, steps Sd14 and Sd15 may be skipped in FIG. 20 and carried out between steps Sd6 and Sd7 in FIG. 19.

The trend information transmitting function described above enables more data on the operation state of the agricultural machine 110 collected throughout its operation period (e.g., sampling data roughly acquired by sampling cyclic data with the predetermined interval TA at the sampling intervals TC) to be stored in the second data storage section 262 and transmitted to the remote monitoring device 130 while reducing the required storage capacity of the second data storage section 262, upon a request being received from the remote monitoring device 130 and/or at an end of the work (specifically, when the startup switch SW has been manually turned off). In the present embodiment, the size of a single data set stored in the second data storage section 262 at the sampling intervals TC (specifically, every 1 minute) is such that a predetermined number of data sets (points in time) (specifically, 720 sets (points in time)) (12 hours' (=720 minutes') worth of data) can be stored therein. Thus, since generally the startup switch SW is rarely kept turned on after 12 hours, the second data storage section 262 is in practice capable of storing the data on the operation state of the agricultural machine 110 collected throughout its operation period for subsequent transmission of the data to the remote monitoring device 130.

Therefore, the user is readily informed of the operation state (e.g., irregularity or like inconvenience) of the agricultural machine 110 throughout its operation period. In addition, the user can preferably exploit the data for initial stability management, monitoring, and tests of the agricultural machine 110.

Furthermore, when the data storage count for the first data storage section 261 has reached a predetermined value, all the predetermined number of data sets (points in time) stored in the first data storage section 261 is transmitted to the remote monitoring device 130. Therefore, no matter whether or not a request has been received from the remote monitoring device 130, all the predetermined number of data sets (points in time) stored in the first data storage section 261 are transmitted to the remote monitoring device 130 when the data storage count has reached a predetermined value. Thus, the data on the operation state of the agricultural machine 110 collected throughout its operation period is all transmitted to the remote monitoring device 130 while reducing the required storage capacity of the first data storage section 261 to the size of the predetermined number of data sets (points in time). Accordingly, the user is capable of being reliably informed of the operation state of the agricultural machine 110 throughout its operation period.

Location Information Transmitting Function

FIG. 21 is a schematic operation diagram of an operation process for a location information transmitting function implemented by the location information transmission control section 247 in the control section 240.

The control section 240 includes the location information transmission control section 247. When the startup switch SW of the agricultural machine 110 is manually turned off (denoted by a5 in FIG. 21), the section 247 stores the location information (specifically, longitude and latitude) and the date and time (specifically, year, month, day, hour, minute, and second according to the international standard Gregorian calendar) in the location information storage section 233. Furthermore, if the location information stored when the startup switch SW is turned off differs from the location information detected during an OFF period of the startup switch SW, the section 247 transmits the detected location information and date and time to the remote monitoring device 130.

Specifically, the location information transmission control section 247 operates as a work section containing a manual turn-off operation receiving section 247a, a data acquisition section 247b, a data storage control section 247c, and a data detection section 247d. The manual turn-off operation receiving section 247a receives a manual turn-off operation of the startup switch SW of the agricultural machine 110. The data acquisition section 247b detects and acquires location information and a date and time via the GPS sensor 231 and the location detection section 232 when the manual turn-off operation receiving section 247a has received a manual turn-off operation of the startup switch SW. The data storage control section 247c temporarily stores in the location information storage section 233 the location information and date and time acquired by the data acquisition section 247b. The data detection section 247d detects location information and a date and time via the GPS sensor 231 and the location detection section 232 at predetermined intervals TD (e.g., every 30 minutes) while the startup switch SW is being turned off.

Under the control of the data storage control section 247c, the location information storage section 233 (see FIG. 6) stores therein location information (latitude and longitude) and a date and time (specifically, year, month, day, hour, minute, and second according to the international standard Gregorian calendar) as of the reception of a manual turn-off operation of the startup switch SW of the agricultural machine 110. The location information may contain the velocity and orientation of the agricultural machine 110.

Specifically, while the startup switch SW is being turned off, the data detection section 247d is powered on by the power supply control section 220 at predetermined intervals TD (e.g., every 30 minutes) to detect location information of the agricultural machine 110 and a date and time.

The startup information transmission control section 241 operates as a work section containing a data transmission section 247e. If the location information stored in the location information storage section 233 (when the startup switch SW is turned of off) differs from the location information detected at predetermined intervals TD (e.g., every 30 minutes) by the data detection section 247d, the data transmission section 247e transmits the location information and date and time detected by the GPS sensor and the location detection section 232 to the remote monitoring device 130 via the communications section 210.

Settings for the predetermined interval TD may be changeable. When this is the case, the predetermined interval TD may be changed in the remote monitoring terminal device 200 or in the remote monitoring device 130. The remote monitoring terminal device 200 may be capable of accepting or rejecting an instruction from the remote monitoring device 130 for a change in value settings for the predetermined interval TD.

When the startup switch SW is manually turned off, power supply to the control section 240 is not turned off by the power supply control section 220. The power supply is turned off by the power supply control section 220 after the data storage control section 247c has stored the location information and date and time in the location information storage section 233.

Exemplary Operation of Location Information Transmission Control Section Next will be described an exemplary operation of the location information transmission control section 247 in reference to FIG. 22 which is a flow chart depicting of an exemplary operation of the location information transmission control section 247.

According to the flow chart shown in FIG. 22, when the startup switch SW is manually turned off (step Se1), the GPS sensor 231 and the location detection section 232 detect and acquire the location information of the agricultural machine 110 and a date and time (step Se2) and store the acquired location information and date and time in the location information storage section 233 (step Se3). The power supply control section 220 then turns off power supply (step Se4).

Next, it is determined whether a timing has been reached in accordance with the predetermined intervals TD (in this example, TD=30 minutes) (step Se5), and the location information transmission control section 247 stands by until a timing is reached in accordance with the predetermined interval TD (No in step Se5). On the other hand, it is determined in step Se5 that a timing has been reached in accordance with the predetermined intervals TD (Yes in step Se5), the OFF control being implemented by the power supply control section 220 is deactivated, and power supply is turned on (step Se6), and the GPS sensor 231 and the location detection section 232 detect and acquire the location information of the agricultural machine 110 and a date and time (step Se7).

Next, it is determined whether the location information stored in the location information storage section 233 differs from the detected location information (step Se8). If the location information stored in the location information storage section 233 is identical to the detected location information (No in step Se8), the process proceeds to step Se5. On the other hand, if it is determined in step Se8 that the location information stored in the location information storage section 233 differs from the detected location information (Yes in step Se8), the detected location information and date and time are transmitted to the remote monitoring device 130 (step Se9), the OFF control implemented by the power supply control section 220 is reactivated, and power supply is turned off (step Se10).

Next, it is determined whether the startup switch SW has been manually turned on (step Se11). If the startup switch SW has not been manually turned on (No in step Se11), the process proceeds to step Se5. On the other hand, if it is determined in step Se11 that the startup switch SW has been manually turned on (Yes in step Se11), the process is ended.

According to the location information transmitting function described above, when the startup switch SW of the agricultural machine 110 is manually turned off, the GPS sensor 231 detects location information and a date and time to store them in the location information storage section 233. While the startup switch SW is being turned ofl power supply is turned on periodically at the predetermined intervals TD so that the GPS sensor 231 can detect location information and a date and time. If the location information stored in the location information storage section 233 differs from the location information detected periodically at the predetermined intervals TD, the location information and date and time detected by the GPS sensor 231 are transmitted to the remote monitoring device 130 so that the location information of the agricultural machine 110 can be monitored while restricting battery power consumption. Thus, the user is capable of being informed of whether the mobile work vehicle or vessel has been moved from where it was when the startup switch SW was turned off. Accordingly, the user can take an action if the agricultural machine 110 has been moved from where it was when the startup switch SW was turned off because of, for example, a theft.

OTHER EMBODIMENTS

The remote monitoring terminal device 200 in accordance with the present embodiment has been described as being applicable to combine harvesters, tillers, rice transplanters, or like mobile work vehicles. The remote monitoring terminal device 200 is by no means limited to these applications and also preferably applicable to mobile work machines, such as tractors, excavators, wheel loaders, carriers, and like construction work machinery, and vessels, such as pleasure crafts and fishing boats.

The present invention may be implemented in various forms without departing from its spirit and main features. Therefore, the aforementioned examples are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The present application hereby claims priority on Japanese Patent Application, Tokugan, No. 2011-225240 filed Oct. 12, 2011 in Japan, the entire contents of which are hereby incorporated herein by reference. The entire contents of the documents cited herein are incorporated by reference.

REFERENCE SIGNS LIST

100 Remote Monitoring System
110 Agricultural Machine (Exemplary Mobile Work Vehicle)
120 Remote Monitoring Center
130 Remote Monitoring Device
140 Communications Network
200 Remote Monitoring Terminal Device
210 Communications Section
220 Power Supply Control Section
231 GPS Sensor (Exemplary Location Sensor)
232 Location Detection Section
233 Location Information Storage Section
240 Control Section
241 Startup Information Transmission Control Section
242 Operation Information Transmission Control Section (Exemplary Data Abridging Control Section)
243 Event Information Transmission Control Section (Exemplary Data Storage Control Section)
244 Data Storage Control Section
245 Sampling Data Storage Control Section
246 Trend Information Transmission Control Section
247 Location Information Transmission Control Section
250 Processor Section
260 Storage Section (Exemplary Data Storage Section)
261 First Data Storage Section
262 Second Data Storage Section
263 Third Data Storage Section
264 Fourth Data Storage Section
BT Battery
SW Startup Switch
T Connection Terminal
TA Predetermined Interval
TB Averaging Interval
TC Sampling Interval
TD Predetermined Interval

The invention claimed is:

1. A remote monitoring terminal device for a mobile work vehicle or vessel, said remote monitoring terminal device being mounted to a mobile work vehicle or vessel for communication with a remote monitoring device to enable the mobile work vehicle or vessel to be remotely monitored by the remote monitoring device, said remote monitoring terminal device comprising:
   connection terminals for feeding data on an operation state of the mobile work vehicle or vessel;
   a data storage control section for temporarily storing, in a data storage section at predetermined intervals, only a predetermined number of latest data sets in the data fed via the connection terminals; and
   a communications section for communication with the remote monitoring device,
   wherein in response to an occurrence of a predetermined event in the mobile work vehicle or vessel, the data storage control section stores in the data storage section the predetermined number of data sets including a data set obtained upon the occurrence of the predetermined event and transmits the predetermined number of data sets stored in the data storage section, together with information indicating the predetermined event, to the remote monitoring device via the communications section.

2. The remote monitoring terminal device as set forth in claim 1, wherein the data storage control section transmits any single one of the predetermined number of data sets stored in the data storage section, as well as the information indicating the predetermined event, to the remote monitoring device in response to the occurrence of the predetermined event and transmits the predetermined number of data sets to the remote monitoring device via the communications section in response to a request from the remote monitoring device for a transmission of the predetermined number of data sets.

3. The remote monitoring terminal device as set forth in claim 1, wherein the occurrence of the predetermined event is a detection of an irregularity in the mobile work vehicle or vessel.

4. The remote monitoring terminal device as set forth in claim 1, wherein the occurrence of the predetermined event is a manual turn-on or turn-off of a manual operation member for issuing an instruction for the mobile work vehicle or vessel to implement a predetermined operation.

5. The remote monitoring terminal device as set forth in claim 2, wherein the occurrence of the predetermined event is a detection of an irregularity in the mobile work vehicle or vessel.

6. The remote monitoring terminal device as set forth in claim 2, wherein the occurrence of the predetermined event is a detection of an irregularity in the mobile work vehicle or vessel.

* * * * *